United States Patent
He et al.

(10) Patent No.: US 10,958,769 B2
(45) Date of Patent: *Mar. 23, 2021

(54) ACTIVATION OF PERFORMANCE MONITORING COMPONENT OF NETWORK PROTOCOL BASED ON NETWORK METRICS

(71) Applicant: EMC IP Holding Company LLC, Hopkinton, MA (US)

(72) Inventors: Xuebin He, Westwood, MA (US); Kathleen Moriarty, Arlington, MA (US); Amy Seibel, Cambridge, MA (US); Akshaya Khare, Cambridge, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/741,256

(22) Filed: Jan. 13, 2020

(65) Prior Publication Data

US 2021/0006642 A1    Jan. 7, 2021

Related U.S. Application Data

(63) Continuation-in-part of application No. 16/459,012, filed on Jul. 1, 2019, now Pat. No. 10,855,813.

(51) Int. Cl.
*H04L 29/06* (2006.01)
*H04L 12/24* (2006.01)
*H04L 12/26* (2006.01)

(52) U.S. Cl.
CPC .......... *H04L 69/02* (2013.01); *H04L 41/5009* (2013.01); *H04L 43/0817* (2013.01);
(Continued)

(58) Field of Classification Search
CPC . H04L 69/02; H04L 63/0485; H04L 41/5009; H04L 43/0817; H04L 43/16; H04L 65/80; H04L 65/1069
See application file for complete search history.

(56) References Cited

U.S. PATENT DOCUMENTS 10,567,245 B1 *  2/2020  Patil .................. H04L 41/147
2011/0280134 A1 * 11/2011  Zheng ................ H04L 43/0811
                                                            370/241
(Continued)

OTHER PUBLICATIONS

H. Elkins et al., "IPv6 Performance and Diagnostic Metrics (PDM) Destination Option," Internet Engineering Task Force (IETF), Request for Comments: 8250, Sep. 2017, 30 pages.

(Continued)

*Primary Examiner* — Arvin Eskandarnia
*Assistant Examiner* — Chhian (Amy) Ling
(74) *Attorney, Agent, or Firm* — Ryan, Mason & Lewis, LLP

(57) ABSTRACT

A system in one embodiment comprises a first endpoint device that is configured to communicate with a second endpoint device using a given communication protocol. The first endpoint device is configured to monitor a communication session under the given communication protocol and to determine a metric value associated with a given network metric based at least in part on the monitoring. The first endpoint device is further configured to determine that a network condition has occurred based at least in part on a comparison of the metric value to a threshold value for the given network metric and to activate a performance monitoring component of the given communication protocol for the first endpoint device based at least in part on the determination that the network condition has occurred. The first endpoint device is further configured to generate per-
(Continued)

formance data associated with the communication session utilizing the activated performance monitoring component.

20 Claims, 7 Drawing Sheets

(52) U.S. Cl.
CPC .......... *H04L 43/16* (2013.01); *H04L 63/0485* (2013.01); *H04L 65/1069* (2013.01); *H04L 65/80* (2013.01)

(56) References Cited

U.S. PATENT DOCUMENTS

| 2015/0281008 | A1* | 10/2015 | Kumar | H04L 43/16 709/224 |
|---|---|---|---|---|
| 2017/0104675 | A1* | 4/2017 | Acharya | H04L 43/00 |
| 2017/0155742 | A1* | 6/2017 | Guo | H04L 67/025 |
| 2018/0276063 | A1* | 9/2018 | Mendes | H04L 41/0686 |
| 2019/0089750 | A1* | 3/2019 | Hassan | H04L 45/245 |

OTHER PUBLICATIONS

J. Schaad, "CBOR Object Signing and Encryption (COSE)," Internet Engineering Task Force (IETF), Request for Comments: 8152, Jul. 2017, 121 pages.
R. Barnes, "Use Cases and Requirements for JSON Object Signing and Encryption (JOSE)," Internet Engineering Task Force (IETF), Request for Comments: 7165, Apr. 2014, 25 pages.
D. Eastlake 3rd et al., "US Secure Hash Algorithms (SHA and SHA-Based HMAC and HKDF)," Internet Engineering Task Force (IETF), Request for Comments: 6234, May 2011, 127 pages.
J. Case et al., "A Simple Network Management Protocol (SNMP)," Network Working Group, Request for Comments: 1157, May 1990, 36 pages.
R. Gerhards, "The Syslog Protocol," Network Working Group, Request for Comments: 5424, Mar. 2009, 38 pages.
A. Bittau et al., "Cryptographic Protection of TCP Streams (tcperypt)," Internet Engineering Task Force (IETF), Request for Comments: 8548, May 2019, 32 pages.
T. Dierks et al., "The TLS Protocol, Version 1.0," Network Working Group, Request for Comments: 2246, Jan. 1999, 80 pages.
E. Rescorla, "The Transport Layer Security (TLS) Protocol, Version 1.3," Internet Engineering Task Force (IETF),Request for Comments: 8446, Aug. 2018, 160 pages.
M. Bjorklund, Ed., "Yang—A Data Modeling Language for the Network Configuration Protocol (NETCONF)," Internet Engineering Task Force (IETF), Request for Comments: 6020, Oct. 2010, 173 pages.
First Data, "Data Encryption and Tokenization: An Innovative One-Two Punch to Increase Data Security and Reduce the Challenges of PCI DSS Compliance," A First Data White Paper, https://www.firstdata.com/downloads/thought-leadership/fd_encrypt_token_pci_whitepaper.pdf, Sep. 2009, 22 pages.
E. Lear et al., "Manufacturer Usage Description Specification," Internet Engineering Task Force (IETF), Request for Comments: 8520, Mar. 2019, 60 pages.
S. Deering et al., "Internet Protocol, Version 6 (IPv6) Specification," Internet Engineering Task Force (IETF), Request for Comments: 8200, Jul. 2017, 42 pages.
S. Amante et al., "IPv6 Flow Label Specification," Internet Engineering Task Force (IETF), Request for Comments: 6437, Nov. 2011, 15 pages.
D. Plonka et al., "kIP: A Measured Approach to IPv6 Address Anonymization," ArXiv:1707.03900v1, Jul. 12, 2017, 7 pages.
U.S. Appl. No. 16/740,009 filed in the name of Kathleen Moriarty et al. on Jan. 10, 2020, and entitled "Anonymized Storage of Monitoring Data."

* cited by examiner

ACTIVATION OF PERFORMANCE MONITORING COMPONENT OF NETWORK PROTOCOL BASED ON NETWORK METRICS

RELATED APPLICATION

The present application is a continuation-in-part of U.S. patent application Ser. No. 16/459,012, (now U.S. patent Ser. No. 10,855,813), filed Jul. 1, 2019, and entitled "Controlled Activation of Performance Monitoring Component of Network Protocol," which is incorporated by reference herein in its entirety.

FIELD

The field relates generally to communication systems, and more particularly to network protocols used in such communication systems.

BACKGROUND

The use of session encryption protocols in networking has resulted in increased security for communication sessions between devices in a network. However, session encryption protocols often limit the information that is available to an endpoint device for monitoring the condition of a network. For example, in a message transmitted under a session encrypted protocol, the available information for diagnosing and monitoring network conditions is often limited to the information found in the packet headers or the information that is directly available on the device receiving the message itself.

SUMMARY

In one embodiment, a system comprises a first endpoint device. The first endpoint device comprises at least one processor coupled to memory. The first endpoint device is configured to communicate with a second endpoint device over a network using a given communication protocol. The at least one processor is configured to monitor a communication session under the given communication protocol between the first endpoint device and the second endpoint device and to determine a metric value associated with a given network metric based at least in part on the monitoring. The at least one processor is further configured to determine that a network condition has occurred based at least in part on a comparison of the metric value to a threshold value for the given network metric and to activate a performance monitoring component of the given communication protocol for the first endpoint device based at least in part on the determination that the network condition has occurred. The at least one processor is further configured to generate performance data associated with the communication session utilizing the activated performance monitoring component.

These and other illustrative embodiments described herein include, without limitation, methods, apparatus, systems, and computer program products comprising processor-readable storage media.

DETAILED DESCRIPTION

Illustrative embodiments will be described herein with reference to exemplary communication systems and associated computers, servers, storage devices and other processing devices. It is to be appreciated, however, that embodiments of the invention are not restricted to use with the particular illustrative system and device configurations shown and are intended to be broadly construed, so as to encompass, for example, communication systems comprising various combinations of physical and virtual processing resources. Numerous other system configurations are possible in other embodiments.

Figure 1:
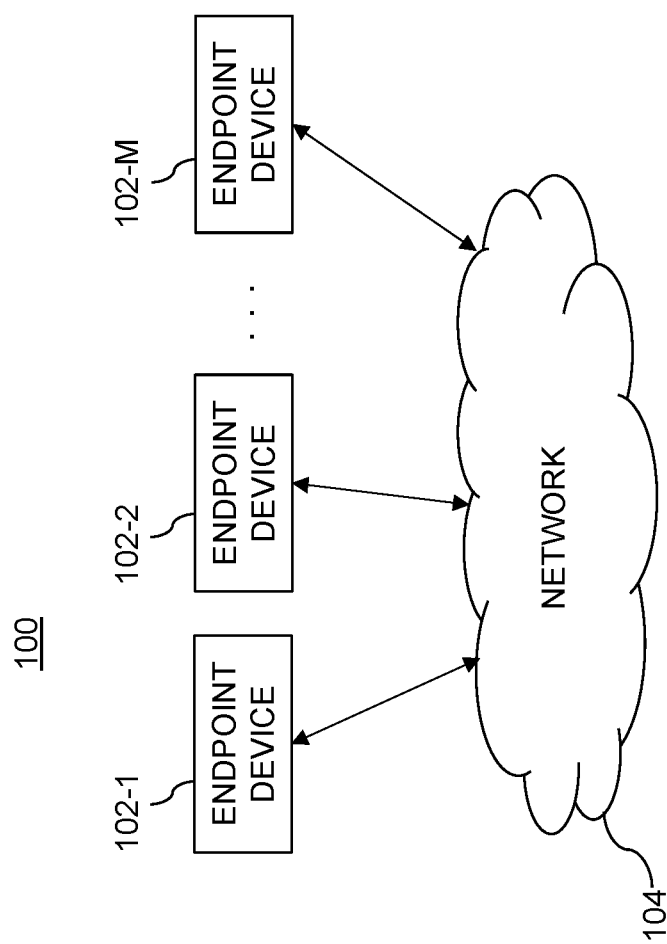
FIG. 1 is a block diagram of a communication system for controlling the activation of performance monitoring components of a network protocol in accordance with an illustrative embodiment.

FIG. 1 shows a communication system 100 configured in accordance with an illustrative embodiment. The communication system 100 comprises a plurality of endpoint devices 102-1, 102-2, . . . 102-M, each of which may also be referred to herein as an endpoint device 102 or collectively may be referred to herein as endpoint devices 102. The communication system 100 also comprises a network 104.

The endpoint devices 102 may comprise processing devices such as, for example, personal computers, workstations, laptops, tablets, smart devices, smart phones, smart watches, servers, databases or any other devices capable of communicating with each other over the network 104.

The network 104 over which the endpoint devices 102 communicate illustratively comprises one or more networks including, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks. In some embodiments, endpoint devices 102 may alternatively communicate directly with each other via wired or wireless connections without utilizing network 104.

Figure 2:
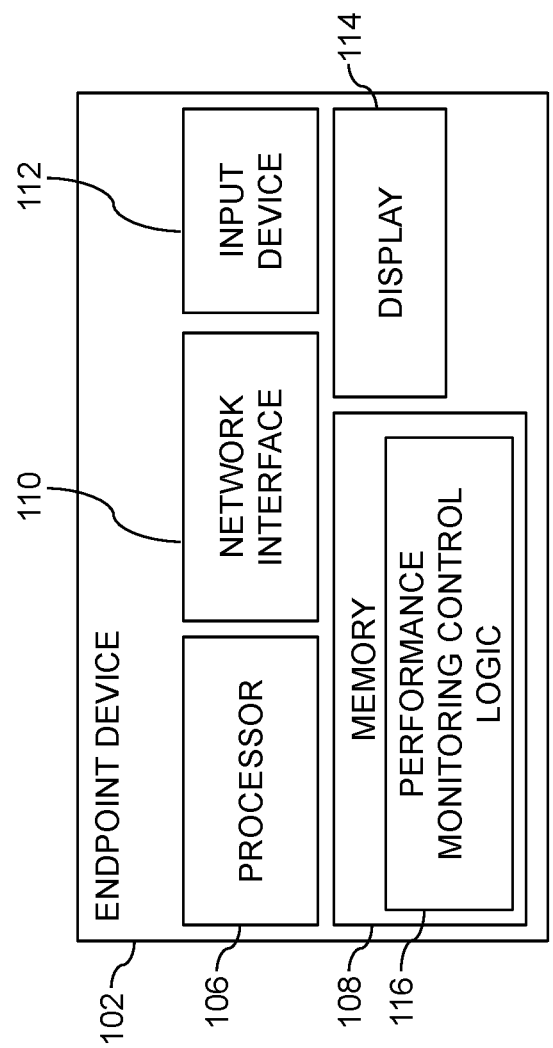
FIG. 2 is a block diagram illustrating an example endpoint device of FIG. 1 in accordance with an illustrative embodiment.

FIG. 2 shows an example endpoint device 102 of communication system 100 in accordance with an illustrative embodiment. The example endpoint device 102 comprises at least one processor 106, memory 108, at least one network interface 110, a display 114, and an input device 112 and may include any other features commonly found in a processing device.

Processor 106 may comprise, for example, a central processing unit (CPU), a microprocessor, a microcontroller, a graphics processing unit (GPU), an application-specific integrated circuit (ASIC), a Field Programmable Gate Array (FPGA), a tensor processing unit (TPU), video processing unit (VPU) or any other form of processing circuitry, as well as portions or combinations of such circuitry elements. Processor 106 may be configured to execute instructions as described below. These instructions may be stored, for example, in memory 108. As used herein, the term "processor" may include a single core processor, a multi-core processor, multiple processors located in a single device, or multiple processors in wired or wireless communication with each other and distributed over a network of devices, the Internet, or the cloud. Accordingly, as used herein, functions, features or instructions performed or configured to be performed by a "processor" may include the performance of the functions, features or instructions by a single core processor, may include performance of the functions, features or instructions collectively or collaboratively by multiple cores of a multi-core processor, or may include performance of the functions, features or instructions collectively or collaboratively by multiple processors, where each processor or core is not required to perform every function, feature or instruction individually.

Memory 108 may comprise, for example, computer readable media, computer readable storage media or other removable/non-removable, volatile/non-volatile storage media. By way of non-limiting examples only, memory 108 may comprise a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, cache memory or any suitable combination of the foregoing.

In some embodiments, computer software including instructions or code for performing the techniques described herein may be stored in associated memory 108 and, when ready to be utilized, loaded in part or in whole (for example, into RAM) and implemented by processor 106. Such software could include, but is not limited to, firmware, resident software, microcode, and the like. The memory 108 may comprise local memory employed during actual implementation of the program code, bulk storage, and cache memories which provide temporary storage of at least some program code in order to reduce the number of times code must be retrieved from bulk storage during implementation.

In some embodiments, the example endpoint device 102 may comprise performance monitoring control logic 116, e.g., computer software instructions or code, stored in memory 108 that is configured to control the activation of performance monitoring components of a network protocol, as will be described in more detail below.

Network interface 110 is configured to transmit and receive data or information to and from the other endpoint devices 102 or any other processing device, server, or other component, via wired or wireless connections. For example, network interface 110 may utilize wireless technologies and communication protocols such as Bluetooth®, WIFI (e.g., 802.11a/b/g/n), cellular networks (e.g., CDMA, GSM, M2M, and 3G/4G/4G LTE/5G), near-field communications systems, satellite communications, those used via a local area network (LAN), those used via a wide area network (WAN), or those used with any other form of communication that allows the example endpoint device 102 to transmit or receive information to or from other endpoint devices 102.

Input device 112 may comprise, for example, a keyboard, a mouse, a touch-sensitive display 114, a keypad, a microphone, or other similar input devices or any other input devices that may be used alone or together to provide a user with the capability to interact with the example endpoint device 102.

Display 114 may comprise any display device that is configured to display information to a user of the example endpoint device 102. For example, in some embodiments, display 114 may comprise a computer monitor, television, smart television, or other similar displays. In some embodiments, display 114 may be integrated into or associated with example endpoint device 102, for example, as a display of a laptop, smart phone, smart watch, or other smart wearable devices, as a virtual reality headset associated with example endpoint device 102, or any other mechanism for displaying or presenting information to a user. In some embodiments, display 114 may comprise, for example, a liquid crystal display (LCD), an e-paper/e-ink display, an organic LED (OLED) display, or other similar display technologies. In some embodiments, display 114 may be touch-sensitive and may also function as an input device 112.

It is to be appreciated that the particular system configuration illustrated in the embodiments of FIGS. 1 and 2 are presented by way of example only, and other embodiments can utilize different arrangements of additional or alternative components. For example, the particular components 102 through 116 of the communication system 100 can be varied in other embodiments. Accordingly, additional or alternative components can be used in other embodiments.

The term "user" as used herein is intended to be construed so as to encompass, for example, human, hardware, software or firmware entities, as well as various combinations of such entities.

It should be understood that the particular arrangements of the communication system components as illustrated in FIGS. 1 and 2 are presented by way of example only. In other embodiments, only subsets of these components, or additional or alternative sets of components, may be used, and such components may exhibit alternative functionality and configurations.

Illustrative embodiments of the communication system 100 will now be described in more detail.

With the increased use of end-to-end encryption protocols, such as, e.g., Transport Layer Security (TLS) 1.3, Quick User Datagram Protocol (UDP) Internet Connections (QUIC), Transmission Control Protocol (TCP) crypt (TCPcrypt) and other encryption protocols, network administrators will lose visibility into network traffic on the wire. To help mitigate this challenge, the Internet Engineering Task Force (IETF) released Request for Comments (RFC) 8250, entitled "IPv6 Performance and Diagnostic Metrics (PDM) Destination Option," a protocol designed to add back some visibility for network traffic management via content stored in the Internet Protocol version 6 (IPv6) packet Destination Option extension headers, the entirety of which is incorporated herein by reference. However, this capability presents additional challenges. For example, if packet header information is always readable, the data could be observed and may facilitate additional tracing by third parties. Without the ability to properly control when and how monitoring using the IPv6 packet header will be turned on and off, or opted into, using IPv6 packet headers for traffic monitoring could inadvertently result in new privacy concerns or security risks. For example, if IPv6 packet header information were always available, it could fall into the wrong hands, and thus become a security risk.

In illustrative embodiments, a communication system 100 comprising performance monitoring control logic 116 is disclosed which introduces the ability to monitor the performance of a network session by activating or de-activating particular performance monitoring components of the network protocol. For example, the activation or de-activation of one or more of the Flow Label, Destination Options extension headers such as, e.g., PDM, or other performance monitoring components of the IPv6 protocol may be controlled by performance monitoring control logic 116. While described herein with reference to performance monitoring components of the IPv6 protocol or the Destination Options Extension Header of the IPv6 packet, any other protocol or portion of a header having performance monitoring components that are selectively activatable or de-activatable may also or alternatively be used.

IPv6 packets may be monitored by performance monitoring control logic 116 to determine a status of the network. Performance monitoring control logic 116 may detect or identify behavior changes in traffic on the network, for example, an increase in delays, increase in latency, decrease in throughput, or other similar network behavior changes. Performance monitoring control logic 116 may activate one or more performance monitoring components of the IPv6 header in response to the detection of such changes.

For example, if a traffic pattern changes and indicates that a performance, capacity, or other issue in the network requires troubleshooting, both endpoint devices 102 of the communication session may be notified of an option to enable performance monitoring for a configurable time period. In one example, a default value for the period of time may be used. An opt-in may be configured to occur only once, e.g., upon set-up of a user's endpoint device 102 or in response to the first detection of a pattern change requiring performance monitoring, on an as-needed basis such as, e.g., when a problem is detected after which the opt-in is removed, or on a time-based basis for a predetermined or user selected period of time. A user may also or alternatively be requested to renew the opt-in periodically.

The opt-in process may be automated, e.g., the endpoint device 102 may be configured to automatically opt-in and opt-out of IPv6 packet header monitoring when network conditions pass certain thresholds, or opt-in and opt-out manually, e.g., by the user, either once, periodically or on an as-needed basis.

In an illustrative embodiment, a graphical or text-based representation of the network status may be presented to a user of an endpoint device, e.g., via display 114, in order to inform the user's opt-in-related decisions. The user may also or alternatively be presented with an alert in response to network status changes which provides the user with information about the change and the option to make changes to the opt-in or opt-out. In some embodiments, the user may pre-configure when the alerts will occur, for example, in response to a change in the status of the network or in response to being opted-in by another party such as, e.g., a system administrator or other user which has sufficient credentials to provide consent to opt-in on behalf of the user.

The user may opt-in or opt-out of specific performance monitoring components of the IPv6 header. For example, the user may be presented with the option to select the performance monitoring component or components for which the user desires to provide consent. In some embodiments, any performance monitoring components that are not selected by the user may be considered to have not received consent and instead to have been opted-out.

In some embodiments, the user may be presented with network status data pertaining to a potential or current network condition affecting the user's endpoint device or a potential or aggregate network status data pertaining to a potential or current network condition affecting some or all of the devices on the network. A graphical or text-based explanation of why the performance monitoring is requested and the current status of the network condition may also or alternatively be presented to the user. In some embodiments, the user may receive a notification in response to any updates in status of the network condition, for example, via e-mail, text, push-notifications, or in any other manner. For example, a network administrator may manually push an update on the status to the endpoint device or other device of the user, or updates may be automatically pushed to the endpoint device or other device based on the occurrence of predetermined conditions set by the user, set by a network administrator or determined based on machine learning algorithms. For example, in an example scenario where the network condition is an increase in latency of the network above a predetermined threshold, the user may receive an update indicating a change in the status of the network condition in response to the latency exceeding or falling below the predetermined threshold.

In illustrative embodiments, the performance monitoring components of the IPv6 header may be activated or de-activated automatically by performance monitoring control logic 116. For example, the performance monitoring components may be activated or de-activated in response to the occurrence of one or more designated network conditions. Examples of designated network conditions may include network latency above a predetermined threshold value, delay above a predetermined threshold value, network throughput falling below a predetermined threshold value, or any other network metric that may require troubleshooting or for which additional information may be required to determine a cause. In some embodiments, a designated network condition such as, e.g., a delay or variance in expected network traffic behavior, may be identified using log monitoring or through the use of new or existing traffic monitoring tools, such as, e.g., Yet Another Next Generation (YANG), Manufacturer Usage Description (MUD) or Simple Network Management Protocol (SNMP).

In some embodiments, performance monitoring control logic 116 may activate or de-activate the performance monitoring components of the IPv6 protocol responsive to consent by a user of the corresponding endpoint devices 102, for example, by requesting a user input. For example, in response to the detection of a designated network condition, performance monitoring control logic 116 may pass information from the IPv6 stack to an application executing on endpoint device 102. A user of endpoint device 102 may interact with the application via input device 112 and display 114, e.g. via a graphical user interface, text-based terminal, or in another manner, to respond to the information and either opt-in or opt-out of the additional performance monitoring using the performance monitoring components of the IPv6 header.

In some embodiments, the performance monitoring control logic 116 may also or alternatively automatically activate the performance monitoring components of the IPv6 header if consent to the performance monitoring has been previously received from the user of the endpoint device 116 prior to the occurrence of the one or more designated network conditions. In the case where consent was not previously received, for example, the performance monitoring control logic 116 may instead request consent prior to activating the performance monitoring components of the IPv6 header.

Figure 3:
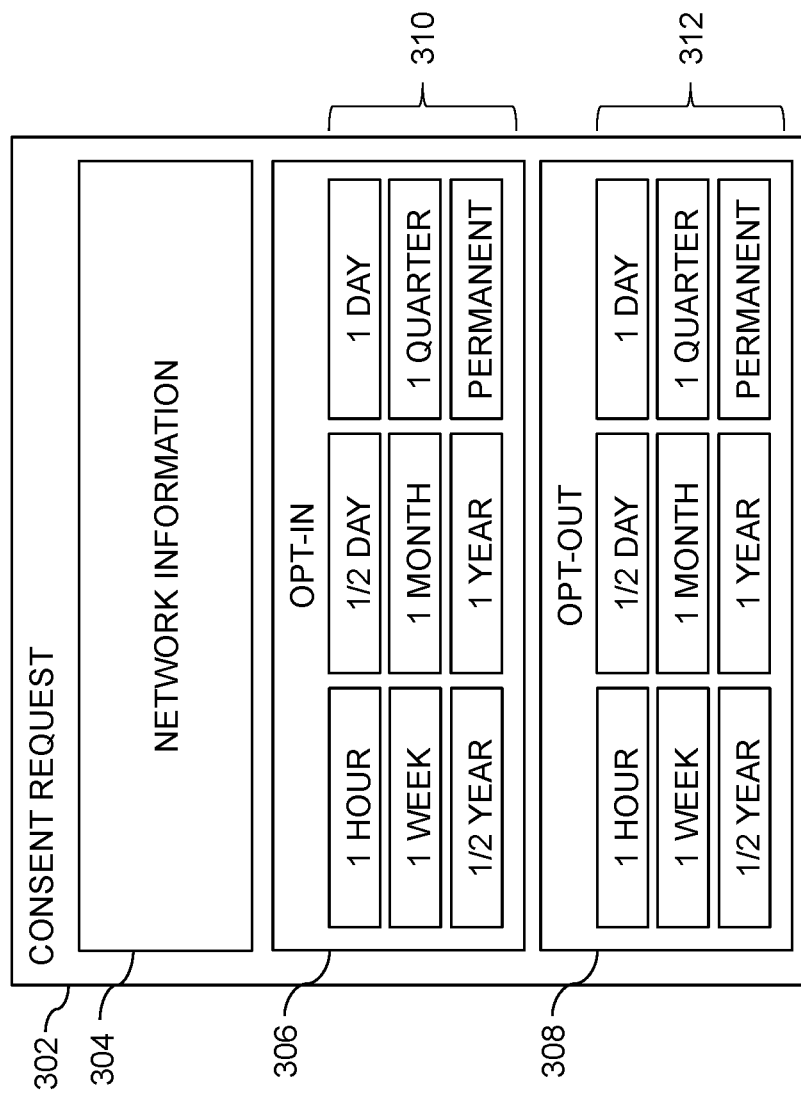
FIG. 3 is a block diagram illustrating an example interface for presenting a consent request in accordance with an illustrative embodiment.

The information passed to the application may comprise a consent request which requests that the user opt-in or opt-out of performance monitoring using the performance monitoring components. With reference now to FIG. 3, for example, in some embodiments, an interface 302 comprising a request for consent may be presented to a user of the endpoint device 102, e.g., via display 114. In some embodiments, the interface 302 comprises network information 304, an opt-in portion 306 and an opt-out portion 308.

Network information 304 comprises an indication of a status of the network. For example, network information 304 may indicate to the user information such as, e.g., latency of the network, delay on the network, packet loss, or other similar network related information. In illustrative embodiments, for example, network information 304 provides a user of endpoint device 102 with an indication of a reason for why consent to activate performance monitoring components is being requested. In some embodiments, network information 304 may also provide an indication of whether the status of the network is a current status or a prior status. For example, the network information 304 may indicate that the network is currently experiencing the indicated status. The network information 304 may also or alternatively present a time, date, or other indication of when the status of the network occurred. For example, the network information 304 may present an indication that the status of the network, e.g., a period of high levels of network delay, occurred an hour ago but is no longer being experienced by the network.

Network information 304 may also or alternatively present to the user an indication of the performance monitoring components for which consent is being requested. For example, network information 304 may indicate to the user that consent is being requested to activate the flow label portion of the IPv6 header to track performance data associated with the Flow Label. As another example, network information 304 may indicate to the user that consent is being requested to activate the PDM Destination Options Extension Header of the IPv6 header to track performance data associated with the PDM option.

The opt-in portion 306 comprises a plurality of activatable elements 310, that the user may activate, e.g., via input device 112, to select a period for which the consent to activate the performance monitoring components is granted. For example, the user may consent to performance monitoring for 1 hour, ½ day, 1 day, 1 week, 1 month, 1 quarter, ½ year, 1 year, or any other period of time. The activatable elements 310 may comprise an element in which the user may specify a desired period of time. The activatable elements may also alternatively comprise a permanent element that the user may select to permanently consent to performance monitoring. The activatable elements 310 may also or alternatively comprise an element in which the user may specify which performance monitoring components for which the user would like to provide consent and opt-in. For example, the user may activate the element to provide consent for all performance monitoring components, a subset of performance monitoring components, or a single performance monitoring component.

The opt-out portion 308 comprises a plurality of activatable elements 312, that the user may activate, e.g., via input device 112, to select a period for which the user denies consent to activate the performance monitoring components. For example, the user may deny consent to performance monitoring for 1 hour, ½ day, 1 day, 1 week, 1 month, 1 quarter, ½ year, 1 year, or any other period of time. The activatable elements 312 may comprise an element in which the user may specify a desired period of time to deny consent. The activatable elements may also or alternatively comprise one or more permanent elements that the user may select to permanently deny consent to performance monitoring. The activatable elements 310 may also or alternatively comprise an element in which the user may specify which performance monitoring components for which the user would like to withdraw or deny consent and opt-out. For example, the user may activate the element to withdraw or deny consent for all performance monitoring components, a subset of performance monitoring components, or a single performance monitoring component.

Performance monitoring control logic 116 may obtain opt-in consent on behalf of the user of the endpoint device from an authorized user that has permissions or credentials to provide such consent. For example, in a corporate setting such as, e.g., a corporate network, a network administrator, supervisor, or another entity may have sufficient permissions or credentials to opt-in the endpoint devices of another employee. As another example, in a consumer setting such as a household, a household member may have sufficient permissions or credentials to opt-in the endpoint devices of another member of the household. As another example, in a support setting such as, e.g., during a remote-access session with a help desk technician, the help desk technician may be given permissions or credentials to opt-in the endpoint device of the user for which the help desk technician is providing support. As another example, an internet service provider may reserve the credentials or permissions to opt-in the endpoint devices of any users on the network when troubleshooting network conditions. For example, a graphical or text user interface that enables a network administrator or other entity to view the endpoint devices in the network may be presented to the network administrator or other entity. The network administrator or other entity may select one or more of the endpoint devices and provide the consent to opt-in the selected endpoint devices for performance monitoring or may decline consent and opt-out the selected endpoint devices for performance monitoring.

Even after consent to opt-in to performance monitoring of the endpoint device of a user has been given, the user may decide to withdraw consent and opt-out of performance monitoring of the user's endpoint device. For example, the user may withdraw consent and opt-out of the performance monitoring using the opt-out portion 308 of the interface 302. As an example, the user may select one of the activatable elements 312 to opt-out of the performance monitoring for a desired period of time, permanently, or may alternatively provide a desired period of time for which the user would like to withdraw consent and opt-out. Interface 302 may present the user with a warning indicating that the user's network performance may decrease or will not improve due to the opt-out. The interface may indicate a confirmation of the opt-out when a selection of one of activatable elements 312 has been made. The user may pre-configure which endpoint devices, endpoint device types (e.g., corporate devices, external devices, devices that the user has previously communicated with or other devices), or user types (e.g. network administrators, end users, officers, etc.), on behalf of whom they would like to opt into monitoring.

In some embodiments, for example where the network is a critical network, performance monitoring control logic 116 may not give a user the option to opt-out.

If the user withdraws consent and opts-out of the performance monitoring, performance monitoring control logic 116 de-activates the performance monitoring components of the endpoint device 102 of the user and no longer collects performance monitoring data from those de-activated performance monitoring components. In some embodiments, any performance monitoring data collected prior to the withdrawal of the consent may be stored by the performance monitoring control logic 116, for example, in memory 108, provided to a system administrator for use in troubleshooting the network condition, provided to another endpoint device 102 participating in a communication session with the endpoint device 102 of the user, or utilized in other similar manners. In some embodiments, any performance monitoring data collected prior to withdrawal of the consent may be purged upon receipt of the withdrawal of consent by the performance monitoring control logic 116.

A network administrator of the network 104 may withdraw consent to share network status or condition information with some or all of the client endpoint devices 102 on the network. For example, if an employee leaves a company, the employee's personal endpoint devices such as, e.g., phones, tablets, desktops, or other devices used to access corporate email or other corporate resources, may be removed from performance monitoring data sharing such that the former employee would no longer be able to see performance monitoring data for the network going forward. Depending on the settings, existing performance monitoring data found on the ex-employee's devices could be remotely wiped. In some embodiments, if an employee leaves or is terminated by the company the employee may be automatically opted out of monitoring and may be notified or prompted to opt-out in addition to the withdrawal of consent to share network status or condition information described above.

Activation of the performance monitoring components of the IPv6 header by performance monitoring control logic 116 provides endpoint-to-endpoint performance monitoring for a given communication session between two endpoint devices. In order for the endpoint-to-endpoint performance monitoring components to generate performance monitoring data, both endpoint devices in the given communication session need to activate the same performance monitoring components.

For example, the user of each endpoint device may be required to provide consent and opt-in to the performance monitoring before the performance monitoring data can be gathered. For example, if the user of one of the endpoint devices 102 declines to opt-in or withdraws consent and opts-out, the performance monitoring components for the IPv6 header will not be activated for that endpoint device 102. Any messages sent by that endpoint device 102 will therefore not include the information associated with the performance monitoring components in the IPv6 header and the receiving endpoint device 102 will simply receive the generic data that is normally contained in the IPv6 header, even though the receiving endpoint device 102 may have the performance monitoring components activated.

In another example, when an endpoint device 102 having de-activated performance monitoring components receives a message sent by an endpoint device 102 having activated performance monitoring components, the endpoint device 102 having the de-activated performance monitoring components will not be able to read the information in the IPv6 header of the message that is associated with the performance monitoring components since those features are not active on the receiving endpoint device 102. Likewise, since the endpoint device 102 that has de-activated performance monitoring components sends a message to another endpoint device 102 that has activated performance monitoring components, the message does not contain data associated with the performance monitoring components so the receiving endpoint device 102 will not be able to perform any calculations or functionality related to the performance monitoring components from that message.

The opt-in may be preconfigured on the participating endpoint devices 102, for example, in the case when both endpoint devices 102 are managed by the same organization even if they cross external networks or in other situations where there is an agreement to allow for this network performance monitoring. As an example, an endpoint device 102 may comprise a personal endpoint device of an employee, e.g., a mobile phone or other processing device, with the employee having consented to performance monitoring as part of an employment or other agreement. For example, the personal endpoint device of the employee may be whitelisted by the organization for performance monitoring at the time of employment and may not require further consent to perform the monitoring. In some embodiments, the performance monitoring is limited to network traffic information and the user session may be protected at the transport level through session encryption such as, e.g., TLS, QUIC, TCPcrypt, or other encryption protocols at the IPv6 layer.

The endpoint device of the user may receive the performance data through logs or management tools monitoring the operating system (OS) level internet protocol (IP) stack. The logs may be optionally presented to the user for review through display tools summarizing, for example, the designated network condition, duration, and statistics for the round-trip-time and server delays. These logs may also or alternatively be provided to an administrator of the communication system 100 who may view this performance monitoring data from the server side of the communication session. In some embodiments, the display of the performance monitoring data may be updated to reflect any changes in the designated network condition and may include trending information both on the user endpoint device side and server side of the communication session.

Machine learning, artificial, or augmented intelligence may be utilized to detect behavior changes corresponding to the designated network condition on the IPv6 communication session sufficient to trigger the presentation of the consent request to the endpoint device 102 of the user for opt-in by the user to the activation of the performance monitoring components of the IPv6 header.

The threshold values for the designated network conditions that trigger either the automatic activation of the performance monitoring components, e.g., if consent was already received, or the presentation of the consent request to the user of the endpoint device, may be pre-determined at or prior to system start-up, set by the user of the endpoint device 102, set by an administrator of the communication system 100, or set in any other manner.

The network information 304 associated with the designated network condition may be displayed to the users of both endpoint devices 102 in the communication session as part of the consent request for opt-in by each user. The network information 304 may also be presented to the users after the performance monitoring components have been activated as part of any results presented in the display of the designated network condition, such that the users are aware of the status of the designated network condition and the continuing needs for performance monitoring. The presented network information 304 may also or alternatively indicate the remaining duration of the opt-in, which may be summarized in the display to one or all endpoints of the communication session.

Performance monitoring control logic 116 may perform an automated action based at least in part on any performance monitoring data generated by the performance monitoring components of the IPv6 header. For example, after activation of the performance monitoring components, e.g., on both endpoint devices in a communication session, the performance monitoring data may be generated. In some embodiments, performance monitoring control logic 116 may automatically present the performance monitoring data to the users of one or both of the endpoint devices 102 that are participating in the communication session, e.g., via respective displays 114.

Performance monitoring control logic 116 may take action to diagnose or correct a designated network condition based at least in part on the performance monitoring data. For example, performance monitoring control logic 116 of a given one of the endpoint devices 102 may automatically adjust or modify one or more portions of the IPv6 protocol for that endpoint device 102 in an attempt to diagnose or correct the designated network condition should it occur. In some embodiments, for example, performance monitoring control logic 116 may automatically provide the performance monitoring data to an administrator of the communication system 100 for use in troubleshooting the cause of the designated network condition.

Figure 4:
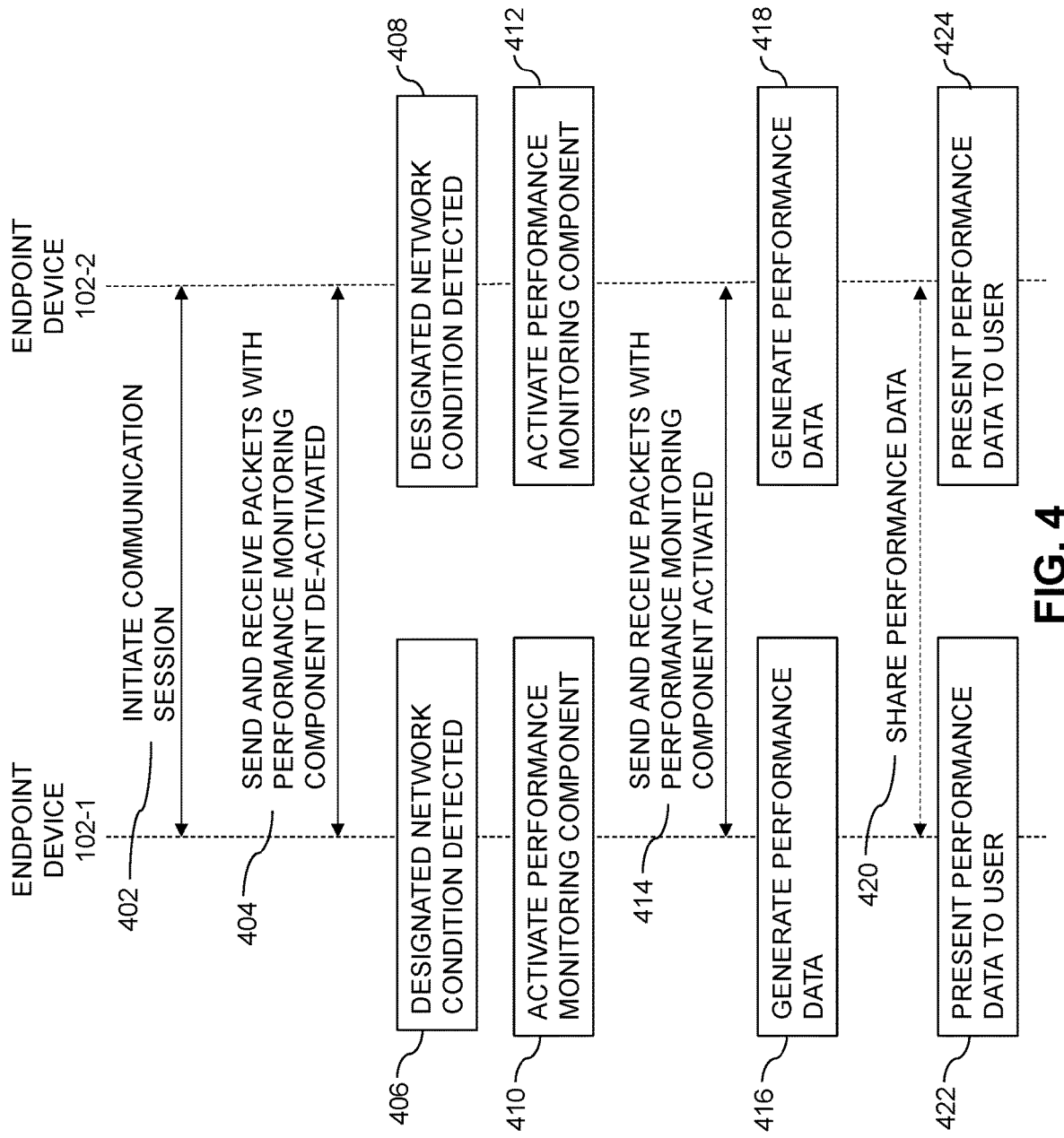
FIG. 4 is a sequence diagram illustrating an example sequence for controlling the activation of performance monitoring components of a network protocol in accordance with an illustrative embodiment.

In an illustrative embodiment, an exemplary messaging sequence performed by performance monitoring control logic 116 will now be described in more detail with reference to the sequence diagram of FIG. 4. It is to be understood that this particular message sequence is only an example, and that additional or alternative message sequences can be carried out in other embodiments. The example messaging sequence shown in FIG. 4 is performed between endpoint device 102-1 and endpoint device 102-2.

At 402, a communication session is initiated between endpoint device 102-1 and endpoint device 102-2. For example, handshake or other messages may be transmitted and received between the endpoint devices 102-1 and 102-2 to establish the communication session. In some embodiments, the communication session is a communication session established using the IPv6 protocol.

At 404, endpoint devices 102-1 and 102-2 send and receive messages to each other with the performance monitoring components de-activated.

At 406, the performance monitoring control logic 116 of endpoint device 102-1 determines that a designated network condition is occurring, for example, as described above. For example, performance monitoring control logic 116 may determine that a delay in the network is above a threshold amount.

At 408, the performance monitoring control logic 116 of endpoint device 102-2 similarly determines that the designated network condition is occurring.

In some embodiments, the determination that the designated network condition is occurring may be performed by another component of the communication network. For example, an endpoint device 102 of a system administrator of the communication network 100 that is not a party to the communication session between endpoint devices 102-1 and 102-2 may determine that a designated network condition is occurring and may provide the performance monitoring control logic 116 with an indication that a designated network condition is occurring.

At 410, the performance monitoring control logic 116 of endpoint device 102-1 activates one or more performance monitoring components of the communication protocol, e.g., flow label, one or more Destination Options Extension headers such as, e.g., PDM, or other portions of the IPv6 header. In some embodiments, the activation of the one or more performance monitoring components may require the presentation of a consent request to a user of the endpoint device 102-1 and the receipt of an opt-in to the activation of the performance monitoring components. In some embodiments, the consent to opt-in may be requested and received prior to detection of the designated network condition or may be requested and received in response to the detection of the designated network condition.

At 412, the performance monitoring control logic 116 of endpoint device 102-2 activates one or more performance monitoring components of the communication protocol, e.g., flow label, one or more Destination Options Extension headers such as, e.g., PDM, or other portions of the IPv6 header. In some embodiments, the activation of the one or more performance monitoring components may require the presentation of a consent request to a user of the endpoint device 102-2 and the receipt of an opt-in to the activation of the performance monitoring components. In some embodiments, the consent to opt-in may be requested and received prior to detection of the designated network condition or may be requested and received in response to the detection of the designated network condition.

At 414, endpoint devices 102-1 and 102-2 send and receive packets with the one or more performance monitoring components of the network protocol activated.

At 416, performance monitoring control logic 116 of endpoint device 102-1 utilizes the performance monitoring components of the messages received from endpoint device 102-2 to generate performance data.

At 418, performance monitoring control logic 116 of endpoint device 102-2 utilizes the performance monitoring components of the messages received from endpoint device 102-1 to generate performance data.

At 420, in some embodiments, the performance monitoring control logic 116 of endpoint device 102-1 shares the performance data generated at 416 with the endpoint device 102-2 and the performance monitoring control logic 116 of endpoint device 102-2 shares the performance data generated at 418 with the endpoint device 102-2. In some embodiments, performance monitoring control logic 116 of one or both of endpoint devices 102-1 and 102-2 may also or alternatively share the performance data with an endpoint device 102 of a system administrator of the communication network 100. In some embodiments, the generated performance data is not shared between endpoint devices 102-1 and 102-2.

At 422, the performance monitoring control logic 116 of endpoint device 102-1 presents the generated and shared performance data to the user of the endpoint device 102-1. In some embodiments, the performance monitoring control logic 116 of endpoint device 102-2 may also or alternatively take one or more other actions automatically, as described above.

At 424, the performance monitoring control logic 116 of endpoint device 102-2 presents the generated and shared performance data to the user of the endpoint device 102-2. In some embodiments, the performance monitoring control logic 116 of endpoint device 102-2 may also or alternatively take one or more other actions automatically, as described above.

Figure 5:
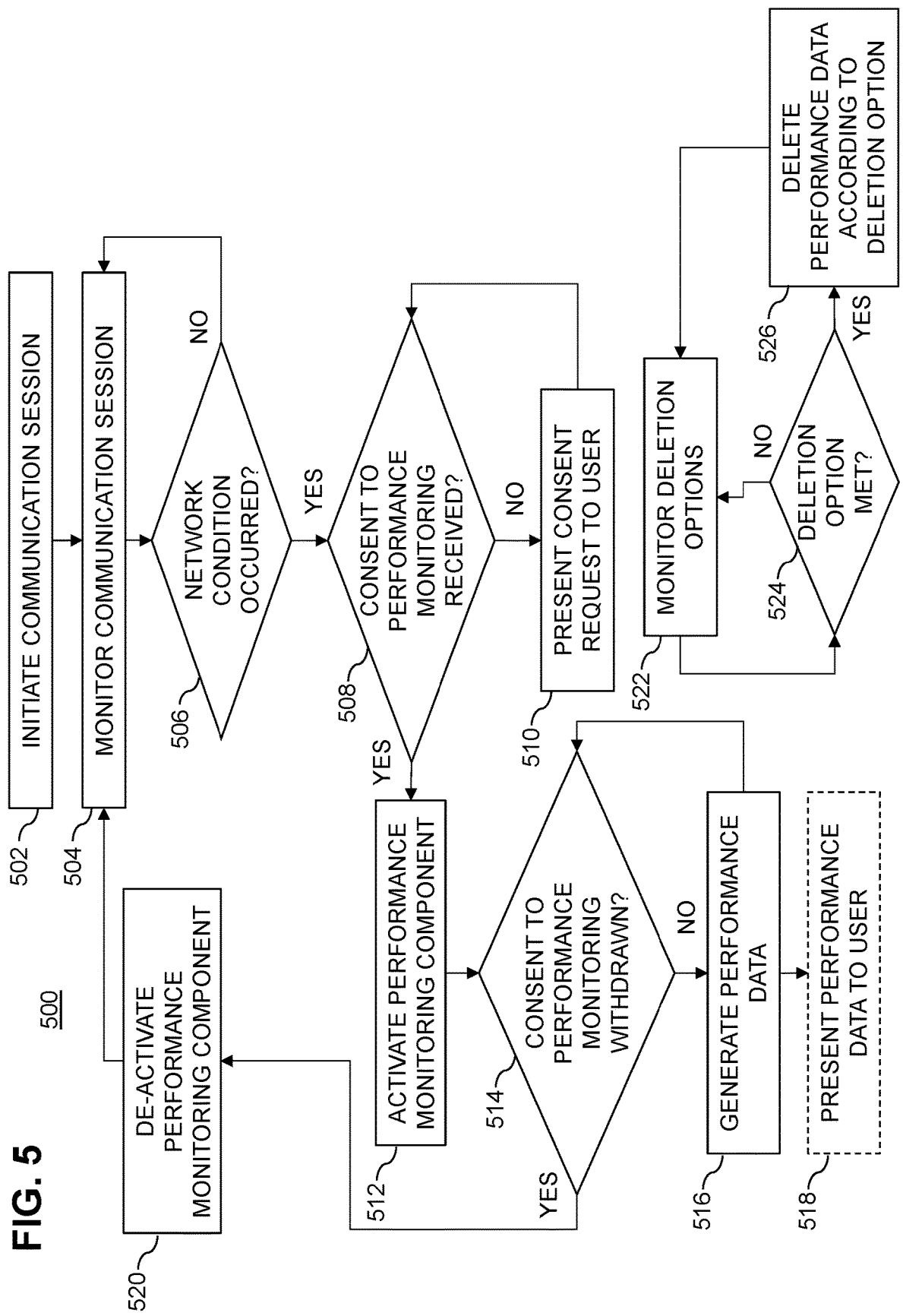
FIG. 5 is a flow diagram illustrating an example process for controlling the activation of performance monitoring components of a network protocol according to an illustrative embodiment.

An exemplary process performed by the performance monitoring control logic 116 of an endpoint device 102 will now be described in more detail with reference to FIG. 5. The process 500 as shown in FIG. 5 includes steps 502 through 526, and is suitable for use in the communication system 100. It is to be understood that this particular process is only an example, and that additional or alternative processes can be carried out in other embodiments.

At 502, the endpoint device 102 initiates a communication session with another endpoint device 102.

At 504, performance monitoring control logic 116 monitors the communication session for designated network conditions. For example, performance monitoring control logic 116 may monitor the communication session for delays between messages. In illustrative embodiments, performance monitoring control logic 116 may monitor the communication session for any other designated network condition, for example, as described above.

At 506, performance monitoring control logic 116 determines whether or not a designated network condition has occurred, e.g., a predetermined threshold value for a given designated network condition has been met. If performance monitoring control logic 116 determines that a designated network condition has not occurred, the process returns to step 504 and performance monitoring control logic 116 continues monitoring the communication session. If performance monitoring control logic 116 determines that a designated network condition has occurred, the process proceeds to step 508.

At 508, performance monitoring control logic 116 determines whether or not consent to opt-in to the activation of performance monitoring components has been received. If consent has not been received, performance monitoring control logic 116 presents a consent request to a user at 510, for example, as described above, and the process returns to step 508. If consent has been received, for example, prior to the detection of the designated network condition or in response to the presented consent request at 510, the process proceeds to step 512. If consent has not been received, another consent request may be presented to the user at 510 or in some embodiments the process may end or return to monitoring for other network conditions at 504. In some embodiments, the process may end or return to monitoring for other network conditions at 504 after a pre-determined number of consent requests have be presented to the user at 510 without receiving consent. In some embodiments, the process may end or return to monitoring for other network conditions at 504 after a pre-determined number of consent requests have be presented to the user at 510 within a pre-determined period of time without receiving consent.

At 512, performance monitoring control logic 116 automatically activates one or more performance monitoring components of the communication protocol. For example, performance monitoring control logic 116 may activate the flow label of the IPv6 header, may activate the PDM Destination Options Extension Header of the IPv6 header, may activate any other performance monitoring component of the IPv6 header, or any combination thereof.

At 514, performance monitoring control logic 116 determines whether or not consent to performance monitoring has been withdrawn, for example, by the user of the endpoint device 102 via the opt-out portion 308 of the interface 302. If the consent has not been withdrawn, performance monitoring control logic 116 generates performance data utilizing the one or more activated performance monitoring components at 516 and, in some embodiments, presents the performance data to the user of the endpoint device 102 at 518.

In some embodiments, performance monitoring control logic 116 may also or alternatively perform one or more other automated actions based at least in part on the generated performance data. If the consent has been withdrawn, performance monitoring control logic 116 de-activates the one or more performance monitoring components at 520 and the process returns to 504 with performance monitoring control logic 116 continuing to monitor the communication session for any other designated network conditions.

Steps 522 through 526 may be performed at any time during the process 500 and will be described in more detail below.

The particular processing operations and other system functionality described in conjunction with the sequence diagram of FIG. 4 and flow diagram of FIG. 5 are presented by way of illustrative example only, and should not be construed as limiting the scope of the disclosure in any way. Alternative embodiments can use other types of processing operations involving communication between endpoint devices in a communication system. For example, the ordering of the sequence or process steps may be varied in other embodiments, or certain steps may be performed at least in part concurrently with one another rather than serially. Also, one or more of the sequence or process steps may be repeated periodically, or multiple instances of the sequences or processes can be performed in parallel with one another in order to implement performance monitoring control logic 116 in a communication system.

In an example scenario, a user is accessing an application on an endpoint device and a server (e.g., a device with which the user's endpoint device has established a communication session) detects a degradation in performance for the communication sessions to the endpoint device. In this example, the application and endpoint device are both used within an enterprise setting or the user is a remote employee with a personal device used to access corporate resources.

The server verifies that it is preconfigured to allow use of performance monitoring for network traffic for this application and user base (e.g., application level configuration or system level configuration via YANG, MUD, SNMP, or other configuration settings that can be remotely verified or verified on the system from the IPv6 triggering function). In the case where MUD is used to set the allowed capabilities of the device or system, a filter may be created for each endpoint device specific to allowing the use of the Destination Options Extension Header for performance monitoring. Since MUD, as defined in RFC 8520, entitled "Manufacturer Usage Description Specification," the entirety of which is incorporated herein by reference, allows for the full IPv4 or IPv6 packet, if MUD is used for this automation capability, a defined extension may be required. The policy allows for the Destination Options Extension Header to be used, which is identified in the preceding next header with the value of "60" as set forth in RFC 8200, entitled "Internet Protocol, Version 6 (IPv6 ) Specification," the entirety of which is incorporated herein by reference. The details provided in this example scenario are intended for simplicity and the defined YANG MUD module may be more precise. For example, the extension may check for specific content matching the values for PDM before permitting the traffic. While MUD allows for filters in either direction, this example only shows one direction and would rely upon the existence of a defined YANG module if MUD were used.

After verification, one or more of the IPv6 Destination Option Extension header, e.g., PDM, the IPv6 Flow Label, server delay calculations, round-trip-time delay calculations or other performance monitoring components of the IPv6 protocol, is initiated. The monitoring continues for a configurable amount of time that may be set by default in advance. If the traffic is blocked, the user may be prompted to determine if access is permitted, thus providing user consent, for example, as described above.

The server, initiating the session using the Destination Option Extension header on an IPv6 packet, detects the lack of a response to the packet (packet dropped). The server is already aware of the session for which the traffic anomaly or delay was detected and the associated endpoint for which to request opt-in. The server application opens a session to the client through the application to present a dialog box such as, e.g., interface 302, explaining the requested monitoring and requests consent. The user may also be given an option to see diagnostic information. This information may be presented via a graphical user interface, such as a checkbox or other elements that the user may activate to opt-in or opt-out of monitoring and set the user's preferences. The information may also or alternatively be presented via a text-based user interface, such as a command in a terminal. A user might also see different network status icons that indicate that the network is running as expected, facing an issue, or resolving. As another example, the user may be presented with words such as "network latency detected," "network latency improving" or "network latency is normal." The user may set alerts for network status changes, accompanied by a prompt to opt-in or opt-out, or receive a message informing them that monitoring has started or ended.

The diagnostics occur at the IP layer and can be logged via standard practices to syslog or recorded with counters using management frameworks such as YANG or SNMP. In some embodiments, the opt-in and ability for the user to see the statistics creates a shim layer linking the user's session to the IP layer information. A shim application may be utilized to provide the statistics to the user from the IP layer which may then be available to applications that wish to provide this interactive opt-in capability.

For example, in one scenario the application is a web application running the Hypertext Transfer Protocol (HTTP) protocol, protected by the TLS protocol. A delay in a response may be detected either at the application layer or by the application server. This is a simple example as the application already has an open session with the user. The application in this case can trigger a dialog with the user to request access to performance monitoring via the Destination Options Extension header, explaining the end-to-end nature of this measurement capability. Upon user consent, the application can trigger the performance monitoring through one of the techniques described above. The application may log the request to begin monitoring to a monitored file and may change a configuration setting in a YANG module or SNMP configuration setting to trigger the IP level monitoring.

If the user selects an option to see results of the performance monitoring, the HTTP application can access either a generated report or the raw logs generated by the performance monitoring. The raw logs or generated report may require a permission level accessible by this end user. For example, the raw logs or generated report may be tied to this user's communication session and access rights for the application and shim layer application.

In another example scenario, the server IP layer detects the delay. In this example, an IP level monitoring application may view logs or information from counters such as those provided in YANG or SNMP modules. A shim application may then identify the associated application and user using the 5-tuple (destination IP, Source IP, destination port, source port, and protocol). If the application was configured to read logs or have an input queue from the shim application, it could be made aware of the delay or anomaly issue and the request to perform monitoring with client opt-in. The application may then trigger the consent request for opt-in, including a request to see if the user would like to view the results and proceed as in the previous example.

The interaction between the application and IP layer in each of the above examples uses a shim application and resources available to both the application and the IP stack. As mentioned, these techniques not only provide a user with the capability to interactively opt-in to performance monitoring if no pre-configuration was available, but also provides that user with the capability to review the results of the performance monitoring such as, e.g., logs, reports, etc.

The data is available on the initiating server as information such as round-trip-time and server round-trip-time are gathered through use of PDM. The Flow Label may be used to track sessions and determine where to troubleshoot further. Session data for the user can be protected during this monitoring via transport or network level encryption options including, but not limited to TLS, QUIC, TCPcrypt, and IPsec. The resulting performance data that is collected may be optionally shared with the participating endpoint devices that have already provided consent by opting into this monitoring. The resulting performance data may also be securely stored or deleted as desired.

In another example scenario, the client system could be a device, sensor, or even a connected vehicle. These examples may be within a corporate network or span user and corporate boundaries for sessions between a manufacturer and a deployed system or device, a user of an application to a server, or other relationships where it may be helpful to evaluate performance, capacity, or trace sessions. Pre-configuration and verification of the permissions to perform this monitoring may be needed where no active user is available or for safety reasons where prompting a user is not practical (e.g., when the user is driving a vehicle).

Preventing connected vehicle security anomalies to and from an edge device may be an example of a case where a pre-configuration and verification for opt-in may be set ahead of time. For this or similar use cases, opt-in could be set in advance in cases where prompting the user or system would be too disruptive.

In addition to two-way automatic alerts of anomalies, a technician servicing or assessing a connected vehicle (on-site or remotely), or a passenger calling for assistance, could view pertinent performance monitoring data such as network traffic data from the trip to help with diagnostics such as determining whether there was a problem with a physical component of the vehicle or just with the network.

In cases where the endpoint devices on both ends of the connection are under control of the same entity (e.g., corporate assets including test vehicles), having a preconfigured opt-in may adhere to existing policy statements and agreements, e.g., between users and the entity, that allow the user's endpoint devices to be subject to performance monitoring.

In another example, a help desk support specialist with the correct permissions, and with the user's consent, may remotely log into the user's device and turn on performance monitoring during an incident that requires troubleshooting. In some embodiments, for example, a network administrator may configure which IPv6 packet header data that they would like to collect on the network's devices, and then decide whether users should be able to make changes to this configuration. Likewise, the network administrator may specify whether a user could opt-in and opt-out of only some performance monitoring or all performance monitoring on the user's endpoint device. In some embodiments, the network administrator may also set the thresholds for activating performance monitoring or requesting consent to opt-in to performance monitoring. In some embodiments, the thresholds may be automatically determined based on the network's typical traffic patterns. Calculations, e.g. related to latency or frequency of connections, may be performed on the user's device, a server, or once the underlying data reached another location. The network administrator may also determine whether or not the user may only see performance monitoring related information pertaining to the user's endpoint device, or performance monitoring information related to the network status in general.

In some embodiments, a corporate IT department may configure a standard image for its machines to enable one of several levels of user visibility and control, e.g. whether an individual user would be able to view data about the network status as a whole or only data pertaining to the user's endpoint device and in which circumstances a user would be able to opt-in or opt-out of network traffic monitoring. Likewise, an administrator may enable auto opt-in on behalf of the users of the network, for example, based on certain thresholds that may be determined automatically using machine learning, based on historical data, based on the administrator's inputs or based on any other factors.

In some embodiments, service providers with the correct permissions may configure these opt-in and opt-out thresholds for the clients or users on the network, either remotely or when accessing or imaging a machine. The user may be alerted if another party opted them into monitoring. In a consumer setting, consumers may configure opt-in preferences for other devices on a consumer network such as, e.g., a home network. For example, a parent may configure the opt-in consent on behalf of a child.

In some cases, the extraction, processing, storage and management of the monitoring information that is gathered from the network protocol packet header during a session both before and after activation of the additional performance monitoring components of the network protocol may present a number of additional technical challenges. With only the endpoints of the communication session being available for monitoring due to the pervasive underlying encryption, there may be substantial privacy and security related technical issues for the use and storage of the packet header data on these endpoints.

If a given endpoint device stores packet header data related to a given communication session without protecting this data, the stored data may become both a security vulnerability and a privacy vulnerability to the network and end users. For example, a third party may obtain the stored packet header data and determine identifying information about the endpoints that were part of a given communication session from the packet header data such as, e.g., IP addresses or other identifying information. In addition to identifying information, the third party may also obtain the corresponding network related data found in the packet header for the given communication session such as message send and receive times, latency, packet size or any other network related data which may be utilized by the third party to further expose the future message data associated with the communication session to attack, for example, by a side channel attack.

In an illustrative embodiment, performance monitoring control logic 116 may also provide protection for the privacy of end users and provide security for the packet header data associated with communication sessions between endpoint devices while still allowing the packet header data to be utilized for troubleshooting purposes.

For example, in addition to the opt-in functionality for activating the performance monitoring components of the packet header described above, performance monitoring control logic 116 may also comprise functionality for the protecting packet header data associated with a communication session that is stored for troubleshooting purposes.

Figure 6:
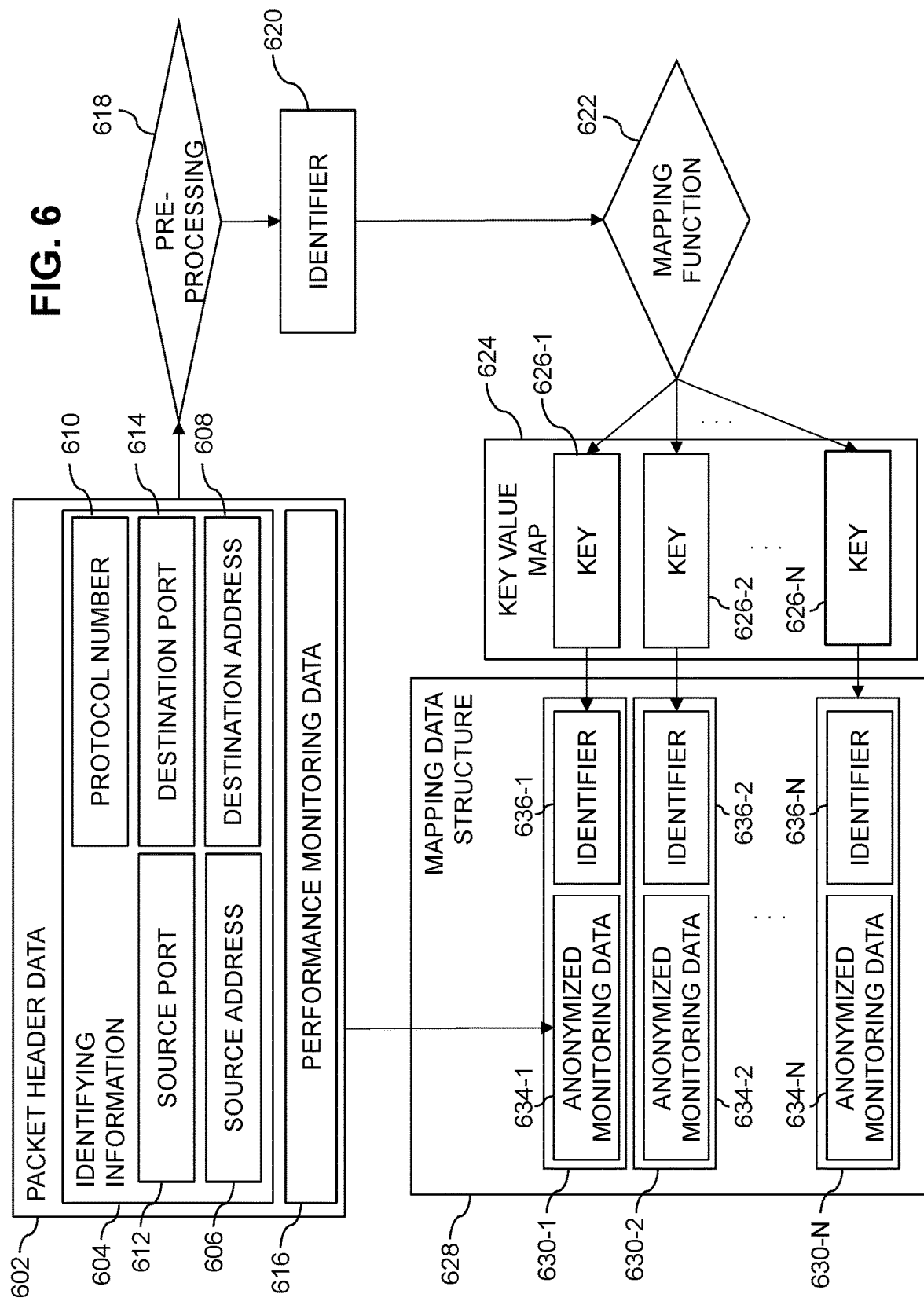
FIG. 6 is a flow diagram illustrating an example process for anonymizing and storing monitoring data in accordance with an illustrative embodiment.

With reference to FIG. 6, the packet header data 602 may comprise identifying information 604 having various data formats including, for example, 2-tuple, 3-tuple, 5-tuple, or any other data format. The 2-tuple format may comprise, for example, a source address 606 for the source endpoint and a destination address 608 for the target endpoint in a communication session, which may comprise IP addresses. The 3-tuple format may comprise, for example, the source address 606, destination address 608 and an additional component of the packet header data such as, e.g., the IPv6 flow label, protocol number 610 or other component of the packet header data. The 5-tuple format may comprise, for example, the source address 606, destination address 608, protocol number 610, source port number 612 and destination port number 614 for the communication session. The packet header data 602 may also comprise performance monitoring data 616 generated by the activated performance monitoring components which may comprise additional information or formats, for example, according to the IPv6 network protocol. For example, the performance monitoring data 616 generated by the activated performance monitoring components may be stored in a variety of formats including, for example, databases, logs, files, structured schema repositories or other formats.

The packet header data 602 may include data about explicit session details such as, e.g., the identities of the endpoint devices, IP addresses, the network protocol and the port information for that communication session, which may reveal information about a user of a given endpoint device that the user may wish to remain private. Since the monitoring of the communication sessions is utilized for network and security management such as, e.g., troubleshooting network delays or other issues, the handling and protection of data that may identify a user or a user's endpoint device or otherwise provide information that may impact a user's privacy such as, e.g., IP addresses, device identifiers, ports, network protocols, content, timing, or other aspects of the user's communication, needs to be protected. In the event of a system compromise by a third party on one of the endpoint devices or an intermediary device, the third party should be inhibited from gaining access to the session information present in the packet header data 602 both prior to and after opt-in to performance monitoring.

Even when performance monitoring is not activated, a sample of packet header data 602 may still be collected to determine a baseline state for the network. For example, even when there are no network related issues to troubleshoot, packet header data may be collected from one or more predetermined users on the network to generate a baseline from which to determine that a network issue is occurring. In some cases, for example, basic information relating to delays, such as total roundtrip time and local server delay, which can be calculated without using the performance monitoring components of the packet header data, may be collected. This basic information may be utilized to establish a baseline which may be used to detect anomalies in the network while storing the smallest amount of data possible.

Network health may also or alternatively be monitored through an existing software package, for example, executing on one or more devices owned, leased or operated by the network administrator or internet service provider. For example, these devices may reside on the network and be different than the endpoint devices. The software package may monitor connections on the network at the application level, some may create a mock connection from dedicated monitoring devices to endpoint devices or to each other to gain insights into network health, or may take other actions to assess the state of the network. Such a software package may trigger the opt-in process and activation of the performance monitoring components on the endpoint devices as described above in response to the detection of an anomaly in the network.

The packet header data 602 may be obtained from users who are pre-configured to be opted-in for monitoring or have opted-in for monitoring, either permanently or for a specified amount of time, as described above. In some embodiments, incoming packet header data 602 may be pre-anonymized and stored or an aggregate version of the packet header data 602 may be captured and stored.

In each of these cases, the packet header data 602 may be anonymized by performance monitoring control logic 116 to remove or otherwise obscure the identifying information found in the packet header data which can be utilized to identify one or both endpoint devices or users of the endpoint devices. For example, anonymizing may comprise one or more of instantly deleting the identifying information, never capturing the identifying information in the first place, or storing the identifying information in such a way that it is not easily connected back to the user. For example, packet header data 602 that does not include the identifying information may be stored in association with an identifier generated based at least in part on at least a portion of the packet header data using a protected mapping table, as will be described in more detail below.

For example, as shown in FIG. 6, pre-processing 618 may be performed on some or all of the packet header data 602 to anonymize the packet header data 602 before the network monitoring calculations are performed. The pre-processing 618 performed on the packet header data 602 to anonymize the packet header data 602 may comprise, for example, hashing, substitution, tokenization, encryption, or other similar pre-processing techniques. Keys or other cryptographic functionality may be utilized to encrypt the session packet header data 602 and generate the identifier 620 such as, e.g., a SHA-256 cryptographic hashing function. The keys may either be asymmetric (public/private key pairs) or symmetric keys. In a case where the keys are symmetric, the key for a given session may be a single key, a group key, or may use split keying technology. For example, some or all of the packet header data 602 may be tokenized using a cryptographic hashing function such as, e.g., the SHA-256 cryptographic hashing function, to generate an identifier 620 which may be used as a key. For example, the 5-tuple of identifying information 604 may be hashed using the SHA-256 cryptographic hashing function to generate a hash of the 5-tuple which may be used as a key.

The identifier 620 is fed into a mapping function 622 such as, e.g., a hash table hash function, which maps the identifier 620 to one of the buckets 630-1, 630-2 . . . 630-N in a mapping data structure 628 using a key value map 624. For example, the key value map 624 comprises a plurality of keys 626-1, 626-2 . . . 626-N which are mapped to corresponding buckets 630-1, 630-2 . . . 630-N of the mapping data structure 628 where each bucket 630-1, 630-2 . . . 630-N is configured to store anonymized monitoring data 634-1, 634-2 . . . 634-N in association with a corresponding identifier 636-1, 636-2 . . . 636-N.

The mapping function 622 identifies the key in the key value map 624 that corresponds to the identifier 620 and determines the corresponding bucket in the mapping data structure 628 based on the mapping found in the key value map 624. In an example scenario, the identifier 620 is passed through the mapping function 622 to identify the corresponding key in the key value map 624 as key 626-1. Based at least in part on the key value map 624, the mapping of key 626-1 to the mapping data structure 628 is determined as bucket 630-1. The monitoring data corresponding to the packet header data 602, e.g., performance monitoring data 616 or any other portion of the packet header data 602 that does not comprise the identifying information 604, is then stored in the bucket 630-1 as anonymized monitoring data 634-1 along with the corresponding identifier 636-1 which, in this case, is the identifier 620 generated by the pre-processing 618.

The anonymized monitoring data 634 stored in the mapping data structure 628 may comprise, for example, timestamps for the last sent and last received packets of a session, ordered packet sequence numbers for outgoing and incoming packets on each unique connection, or other similar data that may be utilized for troubleshooting a network issue. This anonymized monitoring data 634 may need to be correlated back to the particular connection and session from which it originated. Because the anonymized monitoring data 634 needs to be connected back to the session, it will also be tied to a user, meaning there is a need for additional security when handling the data which is provided through the use of the mapping data structure 628 and identifiers 636.

Any cryptographic hashing function may be utilized for generating the identifier 620. In some embodiments, cryptographic hashing functions such as, e.g., SHA-256, for which collisions are considered extremely unlikely may be utilized. Any collisions in the key value map 624 can be handled by storing and checking against the identifier 620 instead of the actual identifying information 604, meaning the identifying information 604 is not stored in association with the performance monitoring data in a location where it could be utilized to compromise the performance monitoring data. Because cryptographic hashing functions such as, e.g., SHA-256, are irreversible, using this kind of tokenization method inhibits a third party from determining which user, connection or session corresponds to the anonymized monitoring data 634 based on the information contained in the mapping data structure 628. In some embodiments, additional security may be employed to further inhibit a third party's use of the data stored in the mapping data structure 628 by encrypting the performance monitoring or other anonymized monitoring data 634 prior to storage in the mapping data structure 628.

In this manner the packet header data 602 may be anonymized and stored in the mapping data structure 628 for later use while preserving an association between the anonymized packet header data and the corresponding session through the use of a generated identifier 620.

In some cases, packet header data may be obtained from a measurement system separate from the endpoint devices 102 which is implemented to monitor and test the network. For example, the measurement system may mimic an endpoint device by sending and receiving packets and may form a baseline for the network based on the packet headers of those packets.

The packet header data 602 used to determine whether or not to activate the performance monitoring components could also come from other sources. For example, network health may be continuously monitored through a software package running on a host device in the network. For example, packet header data 602 could be obtained from such a software package to trigger the start of deeper network monitoring through the activation of the performance monitoring components of the network protocol. Such a software package may function in a variety of ways. For example, the software package may monitor connections at the application level, may create a mock connection from dedicated monitoring devices to gain insight into network health or may monitor the health of the network in any other manner.

The above mentioned pre-opt-in monitoring techniques may be combined in any manner to determine whether the performance monitoring components of the network protocol should be activated. For example, if the packet header data 602 obtained by the monitoring techniques indicates that a predetermined threshold for beginning the opt-in process has been reached, the session may be connected back to endpoint devices 102 of that session to determine whether the users of those endpoint devices 102 have already opted-in, and if not, to prompt them to begin monitoring, for example, as described above. Once the opt-in is received, performance monitoring control logic 116 can activate the performance monitoring components and begin capturing and storing the additional packet header data 602 associated with the performance monitoring components of the network protocol.

When performance monitoring is activated, the packet header data 602 for the communication session may be stored at either or both endpoint devices 102 using an identifier 620 that is generated based at least in part on the packet header data 602 using pre-processing 618 and is mapped using mapping function 622 and key value map 624 to diagnostic or performance related portions of the packet header data 602 via a protected mapping data structure 628, as mentioned above. For example, the identifier may be generated based at least in part on information contained in the 2-tuple, 3-tuple, 5-tuple or other data format of the packet header data 602. The packet header data 602 may be anonymized, for example, by removing portions of the packet header data 602 that may be utilized to identify one or both of the endpoint devices such as, e.g., IP addresses, network protocols, ports, or other similar identifying information. The remaining portions of the packet header data 602 may then be stored in association with the generated identifier 620 using a protected mapping table 628. By using the generated identifier 620, storage of the identifying information 604 found in the packet header data 602 may be hidden or avoided while still preserving the correlation between the packet header data 602 and a given session via the generated identifier 620. Other data such as, e.g., calculated metrics regarding delays, may be stored with the packet header data 602 on the endpoint devices 102 or in another location.

By anonymizing the packet header data 602, only data relevant to the monitoring and troubleshooting of a given session may be stored both during regular monitoring and after opt-in of the performance monitoring. The anonymization and storage of only the relevant data allows data associated with a larger number of sessions to be stored without dramatically increasing the storage requirements. The storage of a smaller amount of data for each session also provides increased privacy as the smaller the amount of data that is stored, the smaller amount of data that can be stolen.

In embodiments where the network protocol is the IPv6 protocol, the IPv6 packet header and extension header information may be obtained at the IPv6 system level interface, from logs via a logging protocol such as syslog or through configuration interfaces with counters such as SNMP or YANG. Similar functionality may be utilized to obtain the packet header data for other network protocols.

The generated identifiers 636 that are used to access anonymized monitoring data 634 in the protected mapping data structure 628 may be generated randomly or through another secure method such as, e.g., hashing, tokenization or other similar methods, as mentioned above. Although the identifiers 636 can be used to map to particular sessions, the selection of distinct and secure identifiers for this mapping inhibits the ability of a third party to associate sessions from the same system that may have started at similar times or that originated from a particular IP address known to the third party. The stored anonymized monitoring data 634 may also be aggregated to further reduce the exposure of privacy related information to third parties.

Storing packet header data for communication sessions in a safe, effective and temporary manner provides additional confidence for the user that their data is secure while the network related issues are being troubleshooted which makes opting-in to the monitoring more appealing to the user.

In addition to protecting or inhibiting discovery of identifying information 604 and correspondences between the identifying information 604 and non-identifying information found in the packet header data 602 through the use of identifiers 620 and the protected mapping data structure 628, the disclosed techniques also provide a mechanism for managing the deletion of anonymized monitoring data 634 stored in the mapping data structure 628 from the endpoint devices 102 in a manner that inhibits the exposure of the anonymized monitoring data 634 in the mapping data structure 628 over time. For example, data erase level functions may be utilized to sanitize the anonymized monitoring data 634 stored on the endpoint devices 102 in the protected mapping data structure 628 at regular intervals or on demand as needed.

The intervals at which the contents of the mapping data structure 628 are to be discarded can vary and may be based at least in part on, for example, time, size or other metrics. For example, the anonymized monitoring data 634 associated with a given identifier 636 may be completely deleted or pruned every predetermined amount of time such as, e.g., minutes, hours, days, or any other amount of time. In some embodiments, every time the size of the mapping data structure 628 increases above a predetermined threshold size a deletion of some or all of the anonymized monitoring data 634 may be triggered. Deletion periods may be determined by policy requirements and there may be exceptions prohibiting the deletion of certain subsets of data under certain conditions. In some cases, encryption and access permissions may be utilized to protect the mapping data structure 628.

The regular deletion of the stored anonymized monitoring data 634 serves several purposes. For example, by deleting the stored anonymized monitoring data 634, the amount of memory that is used to store the anonymized monitoring data 634 will be limited help to avoid excessive resource consumption. In addition, deleting sensitive user information such as identifying information for communication sessions on a regular basis protects against that information being stolen or accessed by third parties. For example, anonymized monitoring data 634 which is no longer stored in memory cannot be stolen or accessed by a third party. By deleting the anonymized monitoring data 634 associated with the user, the mapping data structure 628 may also be kept lean enough to focus only on recent or existing communication sessions which also inhibits expired connections from cluttering the mapping data structure 628 or being otherwise exposed to third parties.

The backup of the stored anonymized monitoring data 634, or portions of the anonymized monitoring data 634, may be either prohibited or required in some embodiments. For example, additional security and privacy protections may be provided by inhibiting or prohibiting the back-up of the stored anonymized monitoring data 634. Alternatively, any back-up of the stored anonymized monitoring data 634 may be controlled in conjunction with deletion protocols for the stored anonymized monitoring data 634. For example, the deletion protocols may also comprise the deletion of any backups or data duplications of the anonymized monitoring data 634 across various devices and platforms, for example, by integrating with existing backup software and existing policies. The use of backups in the context of the stored anonymized monitoring data 634 may comply with any information management policies or retention policies of the storage system.

The performance monitoring control logic 116 may also allow a user of a given endpoint device 102 to access, in real-time, anonymized monitoring data 634 that is collected and stored in the mapping data structure 628 for their communication sessions and to also control when such collected data is deleted. The user may preconfigure their preferences or make changes in real-time, for example, by leveraging the opt-in techniques described above.

Figure 7:
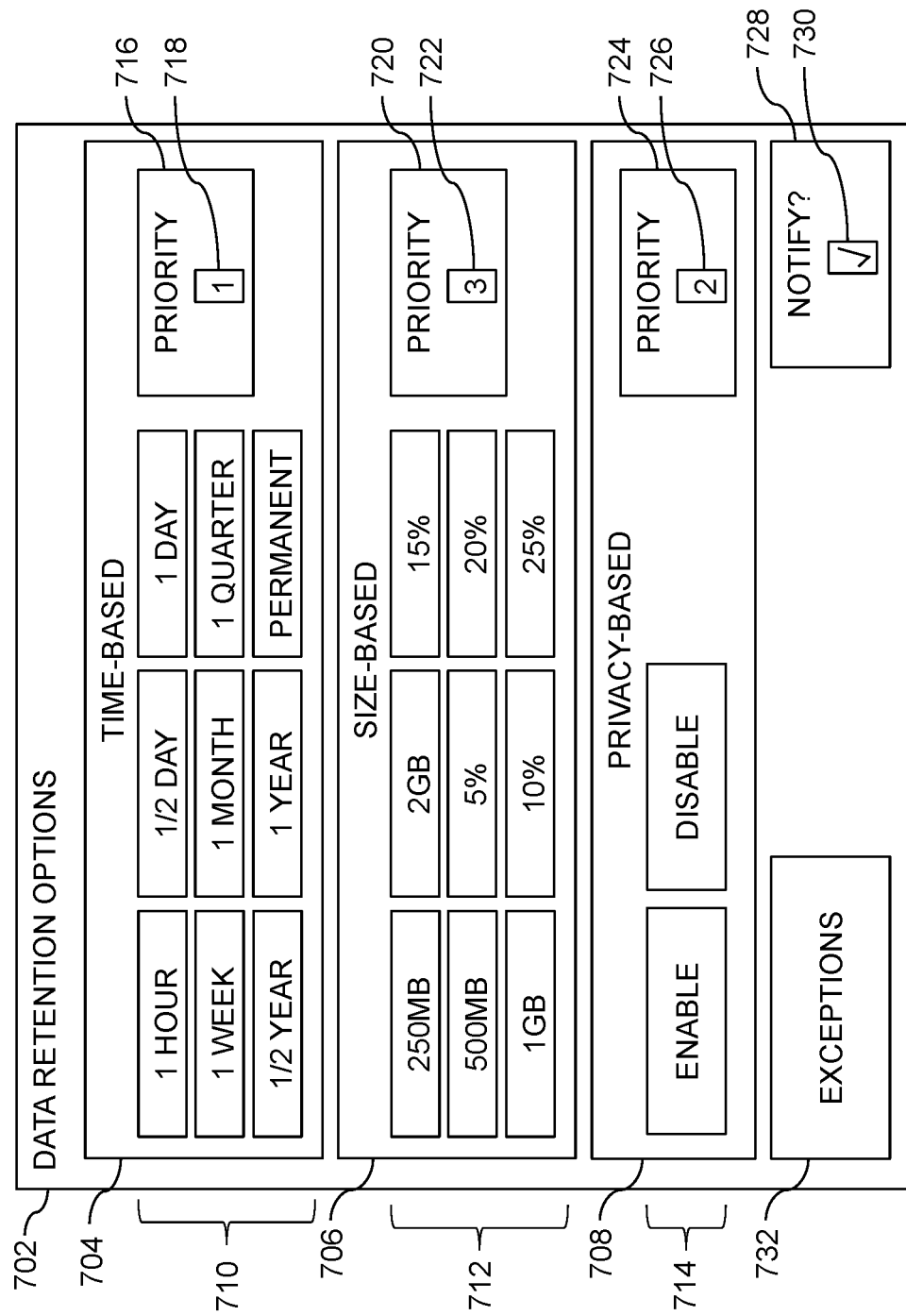
FIG. 7 is a block diagram illustrating an example interface for presenting data retention options to a user in accordance with an illustrative embodiment.

For example, information passed to the application may comprise an interface which requests that the user configure a data retention policy for the monitoring data captured, anonymized and stored by performance monitoring control logic 116. With reference now to FIG. 7, for example, in some embodiments, an interface 702 comprising data retention options may be presented to a user of the endpoint device 102, e.g., via display 114. In some embodiments, the interface 702 comprises time-based deletion options 704, size-based deletion options 706 and privacy-based deletion options 708. Interface 702 allows the user of the endpoint device 102, or any other user with appropriate permissions, to configure the data retention policy for the stored monitoring data.

The time-based deletion options 704 comprise a plurality of activatable elements 710 that the user may activate, e.g., via input device 112, to select or set the amount of time that monitoring data will be stored before deletion. For example, the user may select an activatable element 710 to set the amount of time that the monitoring data may be stored to 1 hour, ½ day, 1 day, 1 week, 1 month, 1 quarter, ½ year, 1 year, or any other amount of time. The activatable elements 710 may also or alternatively comprise an element which may be activated by the user to specify a desired amount of time. The activatable elements 710 may also or alternatively comprise an element which may be activated by the user to trigger a deletion of the data without first waiting a predetermined period of time.

The size-based deletion options 706 comprise a plurality of activatable elements 712 that the user may activate, e.g., via input device 112, to select or set the amount of monitoring data that will be stored before deletion of some or all of the monitoring data. For example, the user may select an activatable element 712 to set the size at which deletion of some or all of the stored monitoring data will occur to 250 megabytes (MB), 500 MB, 1 gigabyte (GB), 2 GB or any other size. The activatable elements 712 may also or alternatively comprise elements which may be activated by the user to specify a size as a percentage of a storage space allocated to the monitoring data or a percentage of the overall storage space of the system. For example, the user may select an activatable element 712 to set the size at which deletion of some or all of the stored monitoring data will occur to 5% of the allocated storage space, 10% of the allocated storage space, 15% of the allocated storage space, 20% of the allocated storage space, 25% of the allocated storage space or any other percentage of the allocated storage space or any percentage of a total storage space of the endpoint device or system.

The privacy-based deletion options 708 comprise a plurality of activatable elements 714 that the user may activate, e.g., via input device 112, to enable or disable the storage of the monitoring data, to delete any existing monitoring data that was already stored, or to perform any other privacy-based deletion. For example, the user may activate the activatable elements 714 to enable or disable the privacy-based deletion.

Each of the time-based deletion options 704, size-based deletion options 706 and privacy-based deletion options 708 may also comprise a priority level 716, 720, and 724, respectively which may be set by the user. For example, an activatable element 718 of the priority level 716 may be activated by the user to set a priority level for the time-based deletion options 704, an activatable element 722 of the priority level 720 may be activated by the user to set a priority level for the size-based deletion options 706 and an activatable element 726 of the priority level 724 may be activated by the user to set a priority level for the privacy-based deletion options 708. The Activatable elements 718, 722 and 726 may be activated to set priority for the corresponding deletion option to any priority value including, for example, priority level 1, priority level 2, priority level 3, or any other priority level. In some embodiments, a deletion option with a priority level that is lower than another deletion option takes precedence over that other deletion option. In some embodiments, a deletion option with a priority level that is higher than another deletion option takes precedence over that other deletion option. While described as priority levels, the relative priority of the different deletion options may be set or determined in any other manner.

Other deletion policies may also or alternatively be implemented. For example, ad-hoc manual deletions may be performed by the user or an administrator to remove specifically targeted monitoring data. Preconfigured data retention policies may be employed such as, e.g., oldest data first, largest data first, de-prioritized data first such as data related to communications sessions that are not experiencing network issues, data that is not subject to retention requirements, or any other options. A graphical analysis may also or alternatively be performed on the stored monitoring data to obtain multiple graphical representations. Deletion decisions may then be made based on the graphical representations.

The user may also be able to set notification settings in the interface 702 to receive a notification of when a deletion of some or all of the monitoring data occurs. For example, a notification option 728 may comprise an activatable element 730 that may be activated or de-activated by the user to control whether or not the user will receive notifications about deletions of the stored monitoring data. The notification option 728 may also or alternatively comprise activatable elements that allow the user to specify where the notification will be sent, the frequency of notifications, or other similar configuration options for receiving notifications about the deletion of the stored monitoring data. For example, notification option 728 may comprise one or more activatable elements for setting notification settings on advance warnings about when a deletion is scheduled. The advance warning may allow the user an opportunity to change the timing or criteria for the deletion prior to the data being deleted.

The interface 702 may also comprise an activatable element 732 which may be activated by the user to configure one or more exceptions for certain data or types data that the user would like to keep. For example, the user may activate the activatable element 732 to specify which data or types of data should be exempt from one or more of the above data retention options. For example, the user may wish data associated with certain types of anomalies to be retained for a longer period of time. In some cases, the exceptions may be configured separately from the interface 702.

A default data retention policy may also be configured or set by a manufacturer or administrator for when the stored monitoring data will be deleted. The default data retention policy may be overridden by the data retention policies specified by the user via interface 702.

In some cases, when a user opts-out of performance monitoring during or after performance monitoring data is being collected and stored, such an opt-out may automatically trigger a deletion of some or all of the user's stored monitoring data. In other embodiments, the stored monitoring data may persist even after the user has opted-out of the performance monitoring unless the user specifies that the data should be deleted. The interface 702 may comprise an activatable element that may be activated by the user to configured whether the stored monitoring data will be deleted upon an opt-out of performance monitoring by the user.

With reference again to FIG. 5, at 522, performance monitoring control logic 116 may be configured to continuously or periodically monitor the status of the above-mentioned deletion options or any other deletion options. The monitoring of step 522 may occur at any time during the process of FIG. 5, for example, prior to opt-in for any network data that was collected, after opt-in for any network data and performance monitoring data that was collected, after opt-out, or at any other time.

At 524, performance monitoring control logic 116 is configured to determine whether or not one or more of the deletion options have been met based at least in part on the monitoring from step 522. If one or more of the deletion options have been met, the process proceeds to step 526 and performance monitoring control logic 116 is configured to handle a deletion of at least a portion of the performance monitoring data 116 according to the one or more deletion options that were met, for example, by deleting some or all of the performance monitoring data. If performance monitoring control logic 116 determines that none of the deletion options have been met at step 524, the process returns to step 522 and performance monitoring control logic 116 continues monitoring the status of the deletion options.

In some embodiments, interface 302 may comprise some or all of the features described with respect to interface 702.

In an illustrative embodiment, performance monitoring control logic 116 may be configured to utilize network metrics and associated threshold values to determine whether or not a network condition has occurred in step 506 of FIG. 5 and when the opt-in and opt-out process should be triggered during monitoring of network traffic on the endpoint device 102. In some cases, for example, a deviation of a network metric from a norm such as, e.g., a historical average or other norm, may trigger the opt-in or opt-out process. In some cases, a graph analysis of the network metrics may be utilized by performance monitoring control logic 116 to identifying trouble areas and set thresholds for triggering the opt-in/opt-out process. Performance monitoring control logic 116 may also be configured to trigger the opt-in/opt-out process for only a subset of the communication sessions rather than triggering the opt-in/opt-out process for all communication sessions. Performance monitoring control logic 116 may also be configured to vary a size of the subset based at least in part on changes in the severity of the network issue. For example, if the severity of the network issue increases or decreases, the number of sessions included in the subset may also increase or decrease. Performance monitoring control logic 116 may also be configured to embed specific threshold values or other data related to the metrics for triggering the performance monitoring in the packet headers as an additional troubleshooting tool.

The following example metrics may be utilized by performance monitoring control logic 116 for determining when to trigger the opt-in/opt-out process. In a scenario where the performance monitoring control logic 116 is not configured to trigger the opt-in or opt-out process, these example metrics may still be utilized by performance monitoring control logic 116 to determine whether or not to activate or disable the performance monitoring components of the packet header. The example metrics described below are not exhaustive and any other network related metrics may be utilized by performance monitoring control logic 116 to determine whether or not to trigger the opt-in/opt-out process or whether or not to activate or disable the performance monitoring components. The example metrics may be utilized in conjunction with one or more of the IPv6 2-tuple, 3-tuple, 5-tuple, information from IPv6 extension header including the destination options extended header or any other instantiation of that header, such as, e.g., the PDM, or any other standards, to determine whether or not to trigger the opt-in/opt-out process or activation/deactivation of the performance monitoring components.

Example metrics from the network layer may comprise round trip time (RTT), number of hops, rate or number of out-of-order packets, rate or number of lost packets, or other network layer metrics that may be utilized to troubleshoot a network.

RTT is an indication of how much time it takes from the moment of sending a packet to an endpoint device to the moment of receiving a response packet from the endpoint device. Depending on the network and server, the RTT could vary from a few milliseconds to hundreds of milliseconds or more depending on whether there is a problem in the network. However, each connection is expected to have a stable RTT, unless there is something abnormal with either the network or the endpoint device. Even with a stable RTT, if it exceeds a certain number, applications that utilize this connection may be affected or not usable at all. Because of this, the performance monitoring components may be utilized for debugging purposes when the RTT of a connection is not stable or is larger than a predetermined threshold for which the application in question can tolerate. In some cases, anonymized monitoring data may be collected and stored securely and privately, for example, in mapping data structure 628 as described above, and may be utilized to determine the RTT for the communication session. For example, the timestamp of sending a packet may be stored for that communication session and once the response of that packet is received, the receiving timestamp may also be recorded. The difference between the sending and receiving timestamps is the RTT. Performance monitoring control logic 116 may be configured to monitor the RTT values and in response to the detection of an increase in the RTT above a threshold value or a change in the RTT by a threshold amount of change, to trigger the opt-in or opt-out process or trigger the activation or deactivation of the performance monitoring components. The threshold value or threshold amount of change for the RTT may be predetermined, set by a user, automatically determined based on the application, automatically determined based on the historical average RTT for that communication session or other communication sessions between the endpoint devices 102 or determined in any other manner.

The hop limit value in an IPv6 header shows how many routers a given packet can hop over before the packet should be dropped. If the network is stable, the hop limit typically does not change dramatically. If the hop limit does change dramatically, that may indicate that the network path taken by a packet between the two endpoint devices 102 has changed. A decrease in the hop limit may be an indication that a better path has been found for the packet in terms of passing fewer routers in between the end point devices 102, which typically indicates an improvement in the network rather than an issue and may be a trigger for stopping performance monitoring. An increase in the hop limit however, e.g., from 5 hops to 9 hops, may be an indication that additional routers are being utilized to route the packet which may result in additional network delay because passing a packet through additional routers is a time-consuming process since the packet will need to be processed by each router to decide where it should be sent next. Performance monitoring control logic 116 may be configured to monitor the hop limit, or the number of hops, and in response to the detection of an increase in the hop limit or number of hops above a threshold value, a decrease in the hop limit or number of hops below a threshold value, or a change in the hop limit or number of hops by a threshold amount of change, to trigger the opt-in or opt-out process or trigger the activation or deactivation of the performance monitoring components. The threshold value or threshold amount of change of the hop limit or number of hops may be predetermined, set by a user, automatically determined based on the application, automatically determined based on the historical average hop limit or number of hops for that communication session or other communication sessions between the endpoint devices 102 or determined in any other manner.

The rate or number of out-of-order packets may be utilized as a metric to determine whether there is an issue in the network. For example, packets are typically supposed to be received in the same order that they were sent from the other endpoint device 102. Receiving the packets out of order may indicate that the network has problems distributing the packets. While communication protocols typically employ mechanisms to reorder out-of-order packets on the endpoint devices, the average packet reordering rate of packets sent using network protocols such as, e.g., IPv6, is typically very low. An increase in the rate of out-of-order packets may indicate that there is a problem in the network which is causing a network delay. Performance monitoring control logic 116 may be configured to monitor the rate or number of out-of-order packets and in response to the detection of an increase in the number of out-of-order packets above a threshold value or a change in the rate of out-of-order packets by a threshold amount of change, to trigger the opt-in or opt-out process or trigger the activation or deactivation of the performance monitoring components. The threshold value or threshold amount of change of the out-of-order packets may be predetermined, set by a user, automatically determined based on the application, automatically determined based on the historical average out-of-order packets for that communication session or other communication sessions between the endpoint devices 102 or determined in any other manner.

The rate or number of lost packets may be utilized as a metric to determine whether there is an issue in the network. The hardware processing the packets, such as, e.g., routers and switches, often have limited resources to process and distribute packets. If such hardware is overloaded, random packets received by that hardware may be dropped in an effort to allow the hardware to continue functioning. High rates of packet loss may indicate that some portion of the network infrastructure is being overloaded between the endpoint devices 102 of a given communication session, which causes delays in the communications between the endpoint devices 102. Performance monitoring control logic 116 may be configured to monitor the rate or number of lost packets and in response to the detection of an increase in the number of lost packets above a threshold value or a change in the rate of lost packets by a threshold amount of change, to trigger the opt-in or opt-out process or trigger the activation or deactivation of the performance monitoring components. The threshold value or threshold amount of change of the lost packets may be predetermined, set by a user, automatically determined based on the application, automatically determined based on the historical average lost packets for that communication session or other communication sessions between the endpoint devices 102 or determined in any other manner.

The rate or number of duplicate packets may be utilized as a metric to determine whether there is an issue in the network. As an example, if an endpoint device 102 detects that the packet that it has sent was not received by the other endpoint device 102 within a certain amount of time, e.g., because no response was received, it typically sends the same packet again to ensure that the packet was communicated to the other endpoint device 102. In some cases, however, the original packet may have been held up at a point in between the endpoint devices instead of being dropped. If both the original packet and the duplicate packet are finally released to the other endpoint device 102, the other endpoint device 102 will receive two copies of the same packet. High rates of packet duplication on the receiver side may be an indication that there are delays or other issues in the network. Performance monitoring control logic 116 may be configured to monitor the rate or number of duplicate packets and in response to the detection of an increase or decrease in the number of duplicate packets above or below a threshold value or a change in the rate of duplicate packets by a threshold amount of change, to trigger the opt-in or opt-out process or trigger the activation or deactivation of the performance monitoring components. The threshold value or threshold amount of change of the duplicate packets may be predetermined, set by a user, automatically determined based on the application, automatically determined based on the historical average duplicate packets for that communication session or other communication sessions between the endpoint devices 102 or determined in any other manner.

Example metrics from the transport layer may comprise TCP setup time, TCP reset rate, TCP retransmission rate, TCP retransmission timeout (RTO), round-trip time using QUIC spin bit or other transport layer metrics that may be utilized to troubleshoot a network.

The TCP setup time may be utilized as a metric to determine whether there is an issue in the network. In order to establish a TCP connection, a three-way handshake is typically performed between the endpoint devices 102. The TCP setup time is how long it takes to finish this handshake. The handshake involves the transmission of three consecutive packets and the receipt of their responses by the endpoint device 102. A timestamp is generated at the time that the first packet is sent from the endpoint device 102 to another endpoint device 102. Another timestamp is generated at the time that the response to the third packet is received. The timestamps may be stored, for example, in the mapping data structure 628 in the manner described above. The timestamps from the first sent packet and third received packet may then be compared to calculate the TCP setup time. In some systems, the average setup time is typically around 100 ms although other systems may comprise different average setup times. Performance monitoring control logic 116 may be configured to calculate the TCP setup time and in response to the calculated TCP setup time being greater than or less than a threshold value, or in response to a failure in the TCP setup where no connection could be established, to trigger the opt-in or opt-out process or trigger the activation or deactivation of the performance monitoring components. The threshold value for the TCP setup time may be predetermined, set by a user, automatically determined based on a historical average TCP setup time for that communication session or other communication sessions between the endpoint devices 102 or determined in any other manner.

The TCP reset rate may be utilized as a metric to determine whether or not there is an issue in the network. In the network protocol, either endpoint device may transmit a reset request to reset the TCP connection. There are many different reasons why an endpoint device may wish to reset the TCP connection. For example, if one endpoint device thinks the TCP connection is still valid while the other endpoint device has already closed the TCP connection, a reset request may be sent to re-open the TCP connection. Performance monitoring control logic 116 may be configured to monitor the rate of TCP reset requests sent or received by the endpoint device 102 and to trigger the opt-in or opt-out process or trigger the activation or deactivation of the performance monitoring components in response to the rate being greater than or less than a threshold amount. For example, the opt-in or opt-out process or activation or deactivation of the performance monitoring components may be triggered by the performance monitoring control logic 116 in response to the sending or receipt of a predetermined number of TCP reset requests, e.g., one or more, an increase or decrease in a rate of TCP reset requests by a predetermined amount or based on other similar metrics. The predetermined number of TCP reset requests and the predetermined amount may be determined in advance, e.g., prior to, during, or after startup, set by a user, automatically determined based on a historical average number of TCP reset requests or historical TCP reset rate for that communication session or other communication sessions between the endpoint devices 102 or determined in any other manner.

The TCP retransmission rate may be utilized as a metric to determine whether or not there is an issue in the network. If the sender endpoint device has not received an acknowledgement from the recipient endpoint device within a certain period of time, the sender endpoint device will typically send retransmission packets to finish the setup of the TCP connection, sometimes continuously. Although retransmission is a relatively common occurrence during the handshake, it may still indicate that there are issues in the network such as packet loss or out-of-order packets. The data that can be used to calculate the average historical retransmission rate may be stored on the sender endpoint device. Performance monitoring control logic 116 may be configured to monitor the TCP retransmission rate and to trigger the opt-in or opt-out process or trigger the activation or deactivation of the performance monitoring components in response to the rate being greater than a threshold amount or changing by a threshold amount change, for example, as compared to a historical average. The threshold amount for the TCP retransmission rate and the threshold amount of change may be predetermined, set by a user, automatically determined based on a historical average number of TCP retransmissions or historical TCP retransmission rate for that communication session or other communication sessions between the endpoint devices 102 or determined in any other manner.

The TCP retransmission timeout (RTO) may be utilized as a metric to determine whether or not there is an issue in the network. Congestion caused by an endpoint device's non-stop sending of retransmission packets may be inhibited through the use of the RTO which determines when the endpoint device should stop sending retransmission packets. The RTO may continue to grow if the network is not functioning properly. The minimum RTO is typically 1 second. If the RTO grows much larger than 1 second or the RTO has increased multiple times in a given period of time, performance monitoring control logic 116 may be configured to trigger the opt-in or opt-out process or trigger the activation or deactivation of the performance monitoring components. The amount of growth for the RTO and the number of increases in a given period of time may be predetermined, set by a user, automatically determined based on a historical average RTO or historical number of RTOs in a given period of time for that communication session or other communication sessions between the endpoint devices 102 or determined in any other manner.

The spin bit of the QUIC protocol may be utilized to calculate the RTT which can be used as a metric to determine whether or not there is an issue in the network. The QUIC protocol is built on top of the UDP protocol. In the QUIC protocol, all signaling data is encrypted with the exception of the QUIC spin bit. The QUIC spin bit for a sent packet and its corresponding response are the same. Timestamps for sent and received packets are tracked on the endpoint device 102. The QUIC spin bit can be utilized to calculate the RTT in a different manner than that described above when the QUIC protocol is being used. For example, the QUIC spin bit can be utilized to pair sent packets with received packets for determining the RTT between the two using their corresponding timestamps. By using the QUIC spin bit instead of the normal RTT calculation, the performance monitoring control logic 116 may be configured to trigger the opt-in or opt-out process or trigger the activation or deactivation of the performance monitoring components only for abnormalities or issues in the network that are detected during the use of the QUIC protocol without triggering them for RTT related issues in the communications between the endpoint devices 102 that do not utilize the QUIC protocol.

In an example scenario, a bank is using laptops and servers with performance monitoring control logic 116 enabled on all devices. An employee is working from home and using QUIC for connecting to the servers. The performance monitoring control logic 116 on the laptop is only monitoring the QUIC packets for this connection rather than all connections of the employee's laptop. The monitoring of the QUIC packets consumes fewer resources than monitoring all of the connections of the laptop to the company network which results in improved performance of the employee's laptop.

Example metrics from the application layer may comprise response time or other application layer metrics that may be utilized to troubleshoot a network.

The response time of an application may be utilized as a metric to determine whether or not there is an issue in the network. In the application layer, the response times may be calculated for a variety of different network protocols, such as, e.g., HTTP, TLS, SSH, etc. For example, the response time for the HTTP protocol may comprise the difference between the moment an HTTP request is sent to another endpoint device 102 and the moment that a response to the HTTP request is received. Similar response times may be calculated for other protocols. A given application may have a threshold value above which response time will affect a user experience where, for example, different applications may have different threshold values.

For example, online games may require very small responsive times so that each action taken by a player will be received by a server and the game will be updated as soon as possible. On the other hand, an online reading application may have a larger threshold value since reading is a relatively slow activity that does not require very much responsiveness as compared to gaming in terms of user interactions.

Performance monitoring control logic 116 may be configured with application specific threshold values for response time in a communication session. If a response time for a given application exceeds its corresponding threshold value, performance monitoring control logic 116 may be configured to trigger the opt-in or opt-out process or trigger the activation or deactivation of the performance monitoring components. The threshold values for each application may be predetermined, set by a user, automatically determined based on a historical average response time for that application or determined in any other manner.

Performance monitoring control logic 116 may be configured to utilize one or more of the above-mentioned metrics and corresponding thresholds to determine whether or not a network condition has occurred in step 506 of FIG. 5 and to trigger the opt-in or opt-out process or trigger the activation or deactivation of the performance monitoring components. In some embodiments, performance monitoring control logic 116 may be configured to utilize the metrics of higher-level layers first when determining whether or not a network condition has occurred. For example, performance monitoring control logic 116 may be configured to utilize application layer metrics first, and when a delay is detected in the use of the application layer metrics, utilize transport layer metrics to confirm that there is a delay. The performance monitoring control logic 116 may also be configured to further confirm the delay using the network layer metrics described above.

For example, performance monitoring control logic 116 may monitor RTT and determine that RTT for a given network protocol has crossed a predetermined threshold value such as, e.g., a value corresponding to a current industry standard. The performance monitoring control logic 116 may trigger the opt-in or opt-out process or trigger the activation or deactivation of the performance monitoring components in response to the RTT crossing the predetermined threshold value.

In another example, performance monitoring control logic 116 may determine that RTT has crossed a threshold value associated with a historical average for the network. For example, a network administrator may have set a sensitivity level, e.g., the opt-in or opt-out or activation or deactivation may be triggered upon RTT crossing a historical average or after the RTT has crossed a threshold value that is a predetermined amount above the historical average of the network. For example, if performance monitoring control logic 116 determines that the RTT is increasing when it crosses the threshold value, monitoring control logic 116 may trigger the opt-in procedures if mutually configured opt-in has been enabled. If mutually configured opt-in is not enabled, performance monitoring control logic 116 may also or alternatively trigger the activation of the performance monitoring components. Likewise, if the RTT is decreasing when it crosses the threshold value, monitoring control logic 116 may trigger the opt-out procedure or the deactivation of the performance monitoring components.

In an example scenario, a company is using performance monitoring control logic 116 for both its laptops and servers. The performance monitoring control logic 116 is configured to automatically turn on or off IPv6 header data for debugging when there are abnormalities in service delivery or consumption of the network. In this scenario, an employee of this company is trying to access the company's human resources website and the delay is very notable. The performance monitoring control logic 116 calculates a large RTT, determines that the RTT exceeds a threshold RTT value and triggers the opt-in process or triggers the activation of performance monitoring components of the IPv6 packet header. For example, assuming an opt-in is received by performance monitoring control logic 116 either before, during or after the calculation of the large RTT, performance monitoring control logic 116 may trigger the activation of the PDM destination options header and add that PDM data to the packets that are sent out to the human resources website. The network monitoring for datacenter administrators may alert the administrators when they find out that there is PDM data in IPv6 packets and that the data indicates that there is a large delay. The administrator may be presented with a visualization such as a network graph associated with the PDM data which may assist the administrator in determining the cause of the delay. For example, the delay may be caused by the network firewall, the server that runs the website or from the website itself. With the ability to narrow down the cause of the delay by receiving this additional packet header data, the administrator may accelerate the problem-solving process.

In some cases, performance monitoring control logic 116 may be configured to utilize a bell curve or other distribution to determine threshold values based on standard deviation or other measures of variance from an average, mean, or median that may signal a problem in the network. For example, a network administrator may select how many standard deviations from the norm or other desired value they are comfortable with in the network. In some cases, performance monitoring control logic 116 may automatically determine the number of standard deviations from the norm to be used. Performance monitoring control logic 116 may determine threshold values based on the selected number of standard deviations and, when the threshold values are crossed, trigger the opt-in or opt-out process or trigger the activation or deactivation of the performance monitoring components. Depending on the distribution of the data, other distributions, graphical analysis or curves may be useful as well.

As an example, performance monitoring control logic 116 may be configured to trigger the opt-in or opt-out process when RTT or any other metric crosses a threshold value that is a predetermined number of standard deviations from the norm for that network or from current industry standards. Performance monitoring control logic 116 may also be configured to require a certain amount of time to pass before triggering the opt-in or opt-out procedures to allow the network to return to the norm, e.g., to wait a certain number of seconds, minutes or another unit of time when the RTT is outside of the normal range.

Performance monitoring control logic 116 may be configured to monitor RTT or other metrics in an anonymized manner using the anonymization techniques described above. For example, some or all of the packet header data may be utilized to generate an identifier 620 which is then correlated to corresponding anonymized monitoring data stored in the mapping data structure 628, which may include the data utilized to calculate the RTT such as timestamps.

Performance monitoring control logic 116 may be configured to utilize a graph analysis to map the network and identify possible areas of concern. For example, performance monitoring control logic 116 may be configured to generate a network graph based on the anonymized monitoring data 634 stored in the mapping data structure 628 which may then be presented to a network administrator for analysis to identify the possible locations of network issues and potential solutions such as, e.g., where there is congestion, where there is availability, etc. In some embodiments, the network graph may alternatively be analyzed by the performance monitoring control logic 116 automatically to make these determinations. Based on the network graph, it may be possible to pinpoint a specific endpoint device or group of endpoint devices in the network that are the cause of the network issue. Once a network issue becomes severe enough or appears to be solved, e.g., a metric crosses a threshold value as described above, performance monitoring control logic 116 may trigger the opt-in or opt-out process or trigger the activation or deactivation of the performance monitoring components.

The use of statistical models, curves, distributions, or graph analysis by performance monitoring control logic 116 allows performance monitoring control logic 116 to determine the threshold values at which the mutually configured opt-in or opt-out process should be triggered. In addition, configuring performance monitoring control logic 116 with functionality for delaying the triggering of the opt-in or opt-out process or triggering the activation or deactivation of the performance monitoring components for a period of time after a metric crossing a threshold value may inhibit unnecessary activation of the performance monitoring components when a temporary network issue occurred or premature deactivation of performance monitoring components when the network issue has not yet been resolved.

In some embodiments, performance monitoring control logic 116 may be configured to embed an indication of the threshold value for a metric as part of the packet header data for sending with a message in the communication session. For example, an IPv6 extension header or any other portion of a packet header may be utilized by performance monitoring control logic 116 to embed the indication of the threshold value for the metric. When a message is sent between the endpoint devices, the message may then include the indication of the threshold value for that metric in its packet header data that the performance monitoring control logic 116 on the sending endpoint device will be using. Performance monitoring control logic 116 at the receiving endpoint device may extract the embedded indication of the threshold value and utilize the indicated threshold value as the threshold value for that metric on the receiving endpoint device for determining when to trigger the opt-in or opt-out or trigger the activation or deactivation of the performance monitoring components.

In some cases, for example, when the threshold value for triggering the opt-in or opt-out or triggering the activation or deactivation of the performance monitoring components is crossed, performance monitoring control logic 116 may record troubleshooting information such as the indication of the threshold value in an IPv6 destination option extension header (or other header) for transmission to the other endpoint device as part of a message. The performance monitoring control logic 116 executing on the other endpoint device may then obtain the troubleshooting information from the message header and utilize the threshold value for triggering the opt-in or opt-out or triggering the activation or deactivation of the performance monitoring components. In some cases, performance monitoring control logic 116 may be configured to automatically trigger the opt-in or opt-out or trigger the activation or deactivation of the performance monitoring components in response to a received message containing the troubleshooting information or the indication of the threshold value for a given metric in the header data.

The troubleshooting information included in the header data may comprise one or more of, for example, which metric has had its threshold crossed, which threshold values were associated with the metric, the current value of the metric, in which direction the value of the metrics was trending, whether any action is required, or other similar information about the troubleshooting information. Other values, or combinations of these values, could also be used. The troubleshooting information may comprise a JSON format or any other format. As an example, the troubleshooting information may comprise "Threshold:250 ms; value:+00.25%" which may comprise an indication of the threshold "threshold:250 ms" and information about the trend "value:+00.25%". Based on the receiving endpoint device's policy, the receipt of this troubleshooting information may trigger the opt-in or opt-out or trigger the activation or deactivation of the performance monitoring components. In some cases, the user of the endpoint device may specify the threshold values for one or more of the metrics, an indication of which may then be provided to the other endpoint device via the packet header of the message. By allowing the user to specify the threshold value for a metric and then propagate the indication of the threshold value to the other endpoint device via the packet header of a message, user specified threshold values for specific metrics may be utilized in determining whether to trigger the opt-in or opt-out or trigger the activation or deactivation of the performance monitoring components on both endpoint devices even where one endpoint device is not initially configured to trigger the opt-in or opt-out or trigger the activation or deactivation of the performance monitoring components for a given threshold value of a metric.

The troubleshooting information for a metric generated by a given endpoint device can provide additional information to a server, e.g., another endpoint device, so that a network administrator of the server can determine the average experience of endpoint devices in certain areas of the network and make necessary improvements and related decisions. For example, a network administrator may use the troubleshooting information to determine that the network in a particular country has a much higher latency than the average for other countries within the larger corporate network. The network administrator may make this determination based on the receipt of message packets from one or more endpoint devices in that country which have troubleshooting information in the packet header that indicates higher metric values than threshold values. The network administrator may then make a determination on how to adjust the network infrastructure, if necessary, to improve the user experience in that country.

Performance monitoring control logic 116 may also be configured to sample packet header data for only a portion of the communication sessions when conducting network monitoring. For example, while multiple endpoint devices may send message packets having packet header data which is available to performance monitoring control logic 116 during communication sessions, whether the performance monitoring components are activated or not, in some embodiments, performance monitoring control logic 116 may only sample packet header data associated with a subset of the communication sessions being monitored in order to limit the overall number or percentage of sessions involved. By only sampling packet header data associated with a subset of the communication sessions being monitored the system resource allocation for monitoring and troubleshooting may be minimized while still providing troubleshooting benefits for the network. In addition, by minimizing the number of communication sessions that are monitored, less packet header data will be stored, for example, in the anonymized manner as described above, which minimizes any potential impact of the monitoring on the privacy of the users of the endpoint devices.

In some cases, performance monitoring control logic 116 may be configured to sample the packet header data associated with a subset of the communication sessions based at least in part on a predefined number or percentage of the overall communication sessions. The predefined number or percentage may be set by a user or administrator of the endpoint device, network, or in another manner. In some cases, performance monitoring control logic 116 may be configured to select the communication sessions to include in the sample subset based at least in part, for example, on communication sessions involving one or more target regions, equal distribution among all regions or a subset of regions, etc. For example, performance monitoring control logic 116 may be configured to select communication sessions for including in the sample subset based at least in part on the IP addresses of one or both of the endpoint devices included in those communication sessions.

In some embodiments, the predefined number may be set automatically by performance monitoring control logic 116. For example, in response to an increase in network related issues such as, e.g., high latency in a portion of the network, the number or percentage of communication sessions that are included in the sample subset may be increased. Likewise, as the network related issues decrease, the number or percentage of the communication sessions that are included in the same subset may be decreased. In some cases, thresholds may be utilized by performance monitoring control logic 116 to determine when to increase or decrease the number or percentage of communication sessions included in the sample subset. For example, a smaller sample subset may be used when a deviation is closer to a historical norm for the network while a larger sample size may be used as the deviation increases.

Performance monitoring control logic 116 may also or alternatively be configured to utilize graph analysis to determine which source endpoint devices and destination endpoint devices are experiencing the most difficulty in the network and may target the sampling subset to those endpoint devices.

Performance monitoring control logic 116 may also or alternatively be configured to determine the network protocol that is being used in a communication session to determine which source endpoint devices and destination endpoint devices to include in the sampling subset. For example, if communication sessions that utilize one or more particular network protocols are experiencing network issues, only the communications sessions using those network protocols may be included in the sampling subset. As an example, if performance monitoring control logic 116 determines that communication sessions using the UDP network protocol are experiencing network issues but the communication sessions using TCP or HTTP network protocols are not, performance monitoring control logic 116 may be configured to include those communication sessions that are using the UDP protocol in the sample subset but not those using the TCP or HTTP network protocols.

When performance monitoring has been enabled, for example, by enabling the use of the IPv6 Flow Label, PDM, or other destination options extension headers, performance monitoring control logic 116 may be configured to limit the number of communication sessions included in the sample subset that will include this added overhead at a given time. For example, performance monitoring control logic 116 may be configured to include a predetermined number of communication sessions that have the performance monitoring enabled in the sample subset, a predetermined percentage of communication sessions that have the performance monitoring enabled, a percentage of sessions from specific IP blocks, regions, time intervals or other sampling subsets. In addition to limiting the resource consumption caused by monitoring the endpoint devices and the network by triggering the opt-in or opt-out process or triggering the activation or deactivation of the performance monitoring components based on thresholds values for one or more metrics of the network, the use of sampling techniques provides additional benefits by constraining the resources being used only to a subset of the communication sessions that meet a given sampling criteria.

Performance monitoring control logic 116 may also or alternatively be configured to determine a priority for a given communication session or group of communication sessions based on one or more factors including, for example, how widespread the network issue is on the network, how severe the network issue is on the network such as, e.g., the amount of deviation from the historical norm, the type of network issue, e.g., prioritizing categories like latency over other categories like packet loss, other factors, or any combination thereof.

In some cases, the factors may be predetermined, for example, by a network administrator, user of an endpoint device or in another manner. For example, a graphical, text-based, audio-based or other user interface may be presented to a user of an endpoint device and the configuration may be set manually by the user via the graphical interface. In another example, the configuration may be pre-configured without further user input.

Performance monitoring control logic 116 may also or alternatively be configured to determine which types of packet header data are monitored and stored. For example, performance monitoring control logic 116 may be configured to only monitor certain portions of the packet header data such as, e.g., one or more of flow label, destination options extension header, or other portions of the packet header data. In some cases, the types of packet header data to be monitored may be pre-configured, set by a user such as, e.g., a user of an endpoint device or a network administrator, or determined in any other manner.

Performance monitoring control logic 116 may also or alternatively be configured to adjust the portions of the packet header data that are monitored and stored, for example, in the mapping data structure 628. For example, as the size of the sample subset increases or decreases, as the standard deviation increases or decreases, or other similar changes in the monitored data occur, performance monitoring control logic 116 may be configured to also adjust which portions of the packet header data are monitored and stored in mapping data structure 628.

For example, when no network issue has been detected, performance monitoring control logic 116 may be configured to monitor and store generic monitoring data in the mapping data structure 628. When a low-level network issue is detected, e.g., due to a metric threshold value being crossed, performance monitoring control logic 116 may be configured to activate one or more performance monitoring components as described above. With the activation of the one or more performance monitoring components, performance monitoring control logic 116 may also be configured to adjust which types of packet header data are being stored in the mapping data structure. For example, while various performance monitoring components may be activated, e.g., flow label, PDM, or other similar performance monitoring components, performance monitoring control logic 116 may be configured to monitor and store data generated by one or more of those activated performance monitoring components. For example, in some cases, even though both flow label and PDM are activated, performance monitoring control logic 116 may be configured to only monitor and store the flow label data.

If the severity of the network issue increases, e.g., additional metric threshold values are crossed or additional endpoint devices have activated the performance monitoring components, performance monitoring control logic 116 may be configured to adjust the portion of the packet header data that is monitored and stored to include additional performance monitoring components, e.g., to include both the flow label data and the PDM data instead of just the flow label data. By adjusting the portion of the packet header data that is being monitored and stored by performance monitoring control logic 116, the resource cost of performing the monitoring and storage may be tailored to match the severity of the network issues that are present.

By configuring the performance monitoring control logic 116 to adjust the size of the sample subset, adjust which portions of the packet header data are monitored and stored, or make other similar adjustments, for example, as the network issue becomes more or less widespread or become higher or lower in priority, the performance monitoring may be implemented in an efficient manner which reduces the overall resource requirements for the performance monitoring on the endpoint devices and the network as a whole.

The above scenarios and techniques are provided as examples only and are not intended to limit the scope of the disclosure in any way.

The use of performance monitoring control logic 116 to control activation of performance monitoring components of a network protocol such as the IPv6 protocol provides several advantages. For example, by monitoring the communication session for designated network conditions and using predetermined threshold information or other techniques to determine when to activate or de-activate the performance monitoring components of the network protocol such as, e.g., PDM, other IPv6 Destination Option Extension Headers, IPv6 Flow Label, or other performance monitoring components, network performance data may be generated for the endpoint device for troubleshooting purposes in an automated way proactively without requiring an administrator to engage the performance monitoring function.

In addition, each endpoint subject to the performance monitoring has configured user consent that is verified prior to the performance monitoring commencing and may be withdrawn by the user even while performance monitoring is being performed. For example, the consent may be verified directly through the network interface (IPv6), through configuration settings verifiable through other automatable means such as YANG module configurations, SNMP mib configurations, MUD configurations, or other verifiable configuration options. The endpoint device may also be identified through attestation assertions for the acceptance parameters to determine for which endpoint devices this type of monitoring is acceptable. Restrictions that could be configured in the verification checks could include IP addresses, types of endpoint devices, manufacturer, certificate chains/path validation, or other meaningful identification and verification mechanisms.

Also, the processing and display of results (e.g. via a graphical or text or terminal-based user interface) will be optionally available to both endpoint devices so any user subject to performance monitoring has the ability to understand and view the full scope of performance monitoring, albeit limited to the performance data exposed in the header such as network traffic functions since the actual message data may be encrypted at the transport layer with TLS or QUIC or at the IP layer with IPsec. By providing the option to present the performance data to both of the endpoint devices that are part of a communication session, instead of just to a system administrator, the performance monitoring is more transparent to the end users who typically do not have access to the information that is being mined from their network usage. For example, the monitoring information is typically available only to the administrator on the server. In addition, providing the performance data to both endpoints may support full disclosure of the data collection practices involved in the performance monitoring to the individual users whose data is being collected. The user may then make an informed decision on whether or not to withdraw consent to the performance monitoring, and therefore stop the other party's ability to receive responses to the packet header information requests or see the generated performance data. The user may also configure the timeframe on which they would like to re-authorize consent which allows the user to give consent for a limited purpose such as, e.g., fixing a particular network condition, rather than a blanket permission to the administrator to collect performance data whenever they want for as long as they want.

As another example advantage of the disclosed techniques, a user with the correct permissions or certificates is able provide consent to opt-in on the behalf of other users. This allows an organization the ability to opt-in employees or other entities under their control as needed. In some embodiments, the user may still be given the option to opt-out when opted-in by another user.

Another advantage of the disclosed techniques provides the user with the ability to see the status of network issues and whether those statuses are old or current, in order to inform the user's decision on whether to consent to opt-in. For example, statuses may include information such as, e.g., timestamps, last update date, a trend of the stats or other information that allows a user to make a determination on whether or not to consent to the opt-in to performance monitoring. The user may also configure alerts, for example, to inform the user if those statuses have changed or if anther user has opted them into monitoring such that they may then make a determination on whether to withdraw consent and opt-out from the performance monitoring.

The anonymization and storage of the monitoring data in a protected mapping data structure provides additional advantages by inhibiting third party access to identifying information contained in the packet header and also reducing the amount of data that is stored for troubleshooting purposes.

By implementing a data retention policy for the stored monitoring data, the security and privacy of the stored data associated with the user's communication session is also enhanced. In addition, the presentation of an interface to the user allowing the user to specify and configure the data retention policy for the stored monitoring data further enhances the user's control over their data monitoring in addition to the opt-in features described above.

By triggering the opt-in or opt-out process based at least in part on a value of a network metric crossing a predetermined threshold value, the performance monitoring may be targeted at specific network issues while still retaining the need for the user to opt-in or opt-out of the monitoring.

In addition, by utilizing a number of standard deviations from a historical norm to set the threshold values for the metrics, the performance monitoring may be tied to the particular system at hand in a manner that increases efficiency and reduces the un-needed activation of the performance monitoring components.

By utilizing sample subsets of communication sessions, the performance monitoring reduces the required overhead needed for the monitoring while targeting the performance monitoring at those specific communication sessions. By dynamically altering the size of the sample subsets based on various criteria, the performance monitoring may be able to dynamically adjust the amount of monitoring being performed to the severity of the network issue, which improves the resource usage of the performance monitoring.

By embedding the specific threshold values for the network metrics that are being utilized to trigger the opt-in or opt-out process in the packet header, triggering information may be provided to other endpoint devices to allow the other endpoint devices to also trigger the opt-in or opt-out based on the same threshold values.

It is to be appreciated that the particular advantages described above and elsewhere herein are associated with particular illustrative embodiments and need not be present in other embodiments.

Also, the particular types of communication system features and functionality as illustrated in the drawings and described above are exemplary only, and numerous alternative arrangements may be used in other embodiments.

As indicated previously, components of a communication system as disclosed herein can be implemented at least in part in the form of one or more software programs stored in memory and executed by a processor of a processing device. For example, at least portions of the functionality for controlling the activation of performance monitoring components of a network protocol as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of communication systems, endpoint devices, network protocols, performance monitoring components, application types, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A system comprising:
a first endpoint device, the first endpoint device comprising at least one processor coupled to memory, the first endpoint device being configured to communicate with a second endpoint device over a network using a given communication protocol, the at least one processor being configured:
to monitor a communication session under the given communication protocol between the first endpoint device and the second endpoint device;
to determine a metric value associated with a given network metric based at least in part on the monitoring;
to determine that a network condition has occurred based at least in part on a comparison of the metric value to a threshold value for the given network metric;
to send, to the first endpoint device, a consent request based at least in part on the determination that the network condition has occurred;
to receive, from the first endpoint device, a response to the consent request to determine that the response to the consent request comprises an indication of consent by a user of the first endpoint device to activate the performance monitoring component;
to activate a performance monitoring component of the given communication protocol for the first endpoint device based at least in part on the determination that the network condition has occurred and the determination that the response to the consent request comprises the indication of consent by the user to activate the performance monitoring component; and
to generate performance data associated with the communication session based at least in part on the activated performance monitoring component.

2. The system of claim 1 wherein the at least one processor is further configured to set the threshold value for the given network metric based at least in part on a number of standard deviations from a historical norm of the given network metric.

3. The system claim 1 wherein the at least one processor is further configured to wait a predetermined amount of time after the determination that the network condition has occurred before activating the performance monitoring component.

4. The system of claim 1 wherein the first endpoint device is configured to communicate with a plurality of endpoint devices over a network in a plurality of communication sessions; and wherein the at least one processor is further configured:
to determine a sample subset of the plurality of communication sessions to monitor based at least in part on at least one sampling criteria;
to monitor the communications sessions in the sample subset;
to determine subset metrics values associated with the given network metric based at least in part on the monitoring of the communication sessions in the sample subset;
to determine that a network condition has occurred for one or more of the communication sessions in the sample subset based at least in part on a comparison of the subset metric values for the one or more of the communication sessions in the sample subset to the threshold value for the given network metric;
to activate the performance monitoring component for the first endpoint device for the one or more of the communication sessions in the sample subset based at least in part on the determination that the network condition has occurred for the one or more of the communication sessions in the sample subset; and
to generate performance data associated with the one or more of the communication sessions in the sample subset based at least in part on the activated performance monitoring component.

5. The system of claim 4 wherein the sample subset comprises a predefined number of communication sessions or a predefined percentage of the plurality of communication sessions.

6. The system of claim 4 wherein the at least one processor is further configured to dynamically adjust the number of communication sessions that are included in the sample subset based at least in part on a number of standard deviations of the subset metric values from a historical norm for the given network metric.

7. The system of claim 4 wherein determining the sample subset of the plurality of communication sessions to monitor based at least in part on at least one sampling criteria comprises determining whether or not to include a given communication session in the sample subset based at least in part on at least one of:
a graphical analysis of the network that indicates whether or not the given communication session is experiencing network issues;
whether or not a network protocol being used by the given communication session is a target network protocol that is experiencing network issues in the network; and
a predetermined number of standard deviations of the subset metric value of the given network metric for the given communication session from a historical norm for the given network metric.

8. A method comprising:
monitoring a communication session under a given communication protocol between a first endpoint device and a second endpoint device;
determining a metric value associated with a given network metric based at least in part on the monitoring;
determining that a network condition has occurred based at least in part on a comparison of the metric value to a threshold value for the given network metric;
sending, to the first endpoint device, a consent request based at least in part on the determination that the network condition has occurred;
receiving, from the first endpoint device, a response to the consent request
determining that the response to the consent request comprises an indication of consent by a user of the first endpoint device to activate the performance monitoring component
activating a performance monitoring component of the given communication protocol for the first endpoint device based at least in part on the determination that the network condition has occurred and the determination that the response to the consent request comprises the indication of consent by the user to activate the performance monitoring component; and
generating performance data associated with the communication session based at least in part on the activated performance monitoring component;
wherein the method is performed by at least one processor of the first endpoint device.

9. The method of claim 8 wherein the method further comprises waiting a predetermined amount of time after the determination that the network condition has occurred before activating the performance monitoring component.

10. The method of claim 8 wherein the first endpoint device is configured to communicate with a plurality of endpoint devices over a network in a plurality of communication sessions; and wherein the method further comprises:
determining a sample subset of the plurality of communication sessions to monitor based at least in part on at least one sampling criteria;
monitoring the communications sessions in the sample subset;
determining subset metric values associated with the given network metric based at least in part on the monitoring of the communication sessions in the sample subset;
determining that a network condition has occurred for one or more of the communication sessions in the sample subset based at least in part on a comparison of the subset metric values for the one or more of the communication sessions in the sample subset to the threshold value for the given network metric;
activating the performance monitoring component for the first endpoint device for the one or more of the communication sessions in the sample subset based at least in part on the determination that the network condition has occurred for the one or more of the communication sessions in the sample subset; and
generating performance data associated with the one or more of the communication sessions in the sample subset based at least in part on the activated performance monitoring component.

11. The method of claim 10 wherein the method further comprises dynamically adjusting the number of communication sessions that are included in the sample subset based at least in part on a number of standard deviations of the subset metric values from a historical norm for the given network metric.

12. The method of claim 10 wherein determining the sample subset of the plurality of communication sessions to monitor based at least in part on at least one sampling criteria comprises determining whether or not to include a given communication session in the sample subset based at least in part on at least one of:

a graphical analysis of the network that indicates whether or not the given communication session is experiencing network issues;

whether or not a network protocol being used by the given communication session is a network protocol that is experiencing network issues in the network; and a predetermined number of standard deviations of the subset metric value of the given network metric for the given communication session from a historical norm for the given network metric.

13. The method of claim 10 wherein the sample subset comprises a predefined number of communication sessions or a predefined percentage of the plurality of communication sessions.

14. The method of claim 8 wherein the method further comprises setting the threshold value for the given network metric based at least in part on a number of standard deviations from a historical norm for the given network metric.

15. A computer program product comprising a non-transitory processor-readable storage medium having stored therein program code of one or more software programs, wherein the program code when executed by at least one processor of a first endpoint device, the first endpoint device comprising at least one processor coupled to memory, the first endpoint device being configured to communicate with a second endpoint device over a network using a given communication protocol, causes the at least one processor:

to monitor a communication session under the given communication protocol between the first endpoint device and the second endpoint device;

to determine a metric value associated with a given network metric based at least in part on the monitoring;

to determine that a network condition has occurred based at least in part on a comparison of the metric value to a threshold value for the given network metric;

to send, to the first endpoint device, a consent request based at least in part on the determination that the network condition has occurred;

to receive, from the first endpoint device, a response to the consent request determine that the response to the consent request comprises an indication of consent by a user of the first endpoint device to activate the performance monitoring component to activate a performance monitoring component of the given communication protocol for the first endpoint device based at least in part on the determination that the network condition has occurred and the determination that the response to the consent request comprises the indication of consent by the user to activate the performance monitoring component; and to generate performance data associated with the communication session based at least in part on the activated performance monitoring component.

16. The computer program product of claim 15 wherein the first endpoint device is configured to communicate with a plurality of endpoint devices over a network in a plurality of communication sessions; and wherein the program code further causes the at least one processor:

to determine a sample subset of the plurality of communication sessions to monitor based at least in part on at least one sampling criteria;

to monitor the communications sessions in the sample subset;

to determine subset metric values associated with the given network metric based at least in part on the monitoring of the communication sessions in the sample subset;

to determine that a network condition has occurred for one or more of the communication sessions in the sample subset based at least in part on a comparison of the subset metric values for the one or more of the communication sessions in the sample subset to the threshold value for the given network metric;

to activate the performance monitoring component for the first endpoint device for the one or more of the communication sessions in the sample subset based at least in part on the determination that the network condition has occurred for the one or more of the communication sessions in the sample subset; and to generate performance data associated with the one or more of the communication sessions in the sample subset based at least in part on the activated performance monitoring component.

17. The computer program product of claim 16 wherein the program code further causes the at least one processor to dynamically adjust the number of communication sessions that are included in the sample subset based at least in part on a number of standard deviations of the subset metric values from a historical norm for the given network metric.

18. The computer program product of claim 16 wherein determining the sample subset of the plurality of communication sessions to monitor based at least in part on at least one sampling criteria comprises determining whether or not to include a given communication session in the sample subset based at least in part on at least one of:

a graphical analysis of the network that indicates whether or not the given communication session is experiencing network issues;

whether or not a network protocol being used by the given communication session is a target network protocol that is experiencing network issues in the network; and a predetermined number of standard deviations of the subset metric value of the given network metric for the given communication session from a historical norm for the given network metric.

19. The computer program product of claim 15 wherein the program code further causes the at least one processor to set the threshold value for the given network metric based at least in part on a number of standard deviations from a historical norm for the given network metric.

20. The computer program product of claim 15 wherein the program code further causes the at least one processor to wait a predetermined amount of time after the determination that the network condition has occurred before activating the performance monitoring component.

* * * * *